US012411440B2

(12) United States Patent
Adachi et al.

(10) Patent No.: US 12,411,440 B2
(45) Date of Patent: Sep. 9, 2025

(54) HEATING DEVICE, FIXING DEVICE, AND IMAGE FORMING APPARATUS

(71) Applicants: Tomoya Adachi, Kanagawa (JP); Yuusuke Furuichi, Kanagawa (JP)

(72) Inventors: Tomoya Adachi, Kanagawa (JP); Yuusuke Furuichi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/319,595

(22) Filed: May 18, 2023

(65) Prior Publication Data

US 2023/0384717 A1 Nov. 30, 2023

(30) Foreign Application Priority Data

May 31, 2022 (JP) ................................ 2022-088501

(51) Int. Cl.
*G03G 15/20* (2006.01)

(52) U.S. Cl.
CPC ................................ *G03G 15/2025* (2013.01)

(58) Field of Classification Search
CPC .................................................. G03G 15/2025
See application file for complete search history.

(56) References Cited

U.S. PATENT DOCUMENTS 6,456,819 B1 * 9/2002 Abe ................... G03G 15/2064 399/329
2003/0170054 A1 * 9/2003 Suzuki ............... G03G 15/2064 399/328
2012/0230742 A1 * 9/2012 Nakagawa .............. B32B 27/34 399/329
2012/0275831 A1 * 11/2012 Ishida ................ G03G 15/2025 399/329
2013/0336672 A1 * 12/2013 Mizuta ............... G03G 21/1867 439/700

(Continued)

FOREIGN PATENT DOCUMENTS

JP 2003-282230 10/2003
JP 2008-275756 11/2008

(Continued)

OTHER PUBLICATIONS

U.S. Appl. No. 18/060,566, filed Nov. 30, 2022, Yuusuke Furuichi, et al.

*Primary Examiner* — Carla J Therrien
(74) *Attorney, Agent, or Firm* — Harness, Dickey & Pierce, P.L.C.

(57) ABSTRACT

A heating device includes a first rotator, a heater including a base having a slide face over which an inner face of the first rotator slides, a second rotator forming an outer face nip between the first rotator and the second rotator and a slide nip between the heater and the inner face, and a lubricant holder disposed between the first rotator and the heater to hold a lubricant. The first rotator, the lubricant holder, and the lubricant satisfy a formula of $H \times X1 \times R \times G \leq A \leq V \times G$, where H is a height of a roughness of the inner face, X1 is a longitudinal length of the first rotator, R is a circumference of the first rotator, G is a specific density of the lubricant, A is an application amount of the lubricant on the slide face or the inner face, and V is a volume of the lubricant holder.

20 Claims, 13 Drawing Sheets

(56) References Cited

U.S. PATENT DOCUMENTS

| | | | | |
|---|---|---|---|---|
| 2015/0139708 | A1* | 5/2015 | Shimura ............ | G03G 15/2042 399/329 |
| 2019/0179243 | A1* | 6/2019 | Hara .................. | G03G 15/2053 |
| 2020/0004182 | A1* | 1/2020 | Yabuki ............... | G03G 15/2053 |
| 2020/0409292 | A1* | 12/2020 | Fujimoto ........... | G03G 15/2025 |
| 2021/0157257 | A1* | 5/2021 | Imaizumi ........... | G03G 15/2025 |
| 2022/0179338 | A1 | 6/2022 | Seshita et al. | |
| 2022/0283530 | A1 | 9/2022 | Adachi et al. | |
| 2022/0291610 | A1 | 9/2022 | Seki et al. | |
| 2022/0299919 | A1 | 9/2022 | Inoue et al. | |
| 2022/0299920 | A1 | 9/2022 | Shimada et al. | |
| 2022/0308511 | A1 | 9/2022 | Someya et al. | |
| 2022/0357697 | A1 | 11/2022 | Furuichi | |
| 2022/0382191 | A1 | 12/2022 | Furuichi et al. | |
| 2022/0382192 | A1 | 12/2022 | Inoue et al. | |
| 2022/0390894 | A1 | 12/2022 | Saito et al. | |
| 2023/0004108 | A1 | 1/2023 | Furuichi et al. | |
| 2023/0010218 | A1 | 1/2023 | Shoji et al. | |
| 2023/0063779 | A1 | 3/2023 | Shimada et al. | |
| 2023/0081075 | A1 | 3/2023 | Someya et al. | |
| 2023/0110956 | A1 | 4/2023 | Furuichi | |

FOREIGN PATENT DOCUMENTS

| | | |
|---|---|---|
| JP | 2010-204587 | 9/2010 |
| JP | 2015-118365 | 6/2015 |
| WO | WO-2023166360 A1 * | 9/2023 |

* cited by examiner

HEATING DEVICE, FIXING DEVICE, AND IMAGE FORMING APPARATUS

CROSS-REFERENCE TO RELATED APPLICATION

This patent application is based on and claims priority pursuant to 35 U.S.C. § 119(a) to Japanese Patent Application No. 2022-088501, filed on May 31, 2022, in the Japan Patent Office, the entire disclosure of which is hereby incorporated by reference herein.

BACKGROUND

Technical Field

Embodiments of this disclosure relate to a heating device, a fixing device, and an image forming apparatus.

Related Art

Related-art image forming apparatuses, such as copiers, facsimile machines, printers, and multifunction peripherals (MFP) having two or more of copying, printing, scanning, facsimile, plotter, and other functions, typically form an image on a recording medium according to image data.

Such image forming apparatuses include a fixing device including a fixing belt and a heater. The fixing belt serving as a rotator is an endless belt that rotates. The heater is a laminated heater that is disposed opposite an inner face of the fixing belt, thus heating the fixing belt. In order to decrease sliding friction between the heater and the fixing belt that slides over the heater, a lubricant is applied to the inner face of the fixing belt.

The lubricant in a proper amount is interposed between the fixing belt and the heater to suppress abrasion of the fixing belt and retain a proper value of driving torque of a pressure roller that drives and rotates the fixing belt.

SUMMARY

This specification describes below an improved heating device. In one embodiment, the heating device includes a first rotator that rotates in a rotation direction. A heater is disposed opposite an inner face of the first rotator. The heater includes a resistive heat generator that heats the first rotator and a base having a slide face over which the inner face of the first rotator slides and an opposite face being opposite to the slide face and mounting the resistive heat generator. One of the slide face of the base of the heater and the inner face of the first rotator is applied with a lubricant. A second rotator is disposed opposite the heater via the first rotator to form an outer face nip between the first rotator and the second rotator and a slide nip between the heater and the inner face of the first rotator. A lubricant holder is disposed outboard from the slide nip in the rotation direction of the first rotator and disposed between the first rotator and the heater. The lubricant holder holds the lubricant. The first rotator, the lubricant holder, and the lubricant satisfy a formula of $H \times X1 \times R \times G \leq A \leq V \times G$, where H is a height of a roughness of the inner face of the first rotator, X1 is a length of the first rotator in a longitudinal direction of the first rotator, R is a circumference of the first rotator, G is a specific density of the lubricant, A is an application amount of the lubricant on the one of the slide face of the base of the heater and the inner face of the first rotator, and V is a volume of the lubricant holder.

This specification further describes an improved fixing device. In one embodiment, the fixing device includes a fixing belt that rotates. A heater is disposed opposite an inner face of the fixing belt. The heater includes a resistive heat generator that heats the fixing belt and a base having a slide face over which the inner face of the fixing belt slides and an opposite face being opposite to the slide face and mounting the resistive heat generator. One of the slide face of the base of the heater and the inner face of the fixing belt is applied with a lubricant. A pressure rotator is disposed opposite the heater via the fixing belt to form an outer face nip between the fixing belt and the pressure rotator and a slide nip between the heater and the inner face of the fixing belt. The pressure rotator rotates and conveys a recording medium in a recording medium conveyance direction. A lubricant holder is disposed outboard from the slide nip in the recording medium conveyance direction and disposed between the fixing belt and the heater. The lubricant holder holds the lubricant. The fixing belt, the lubricant holder, and the lubricant satisfy a formula of $H \times X1 \times R \times G \leq A \leq V \times G$, where H is a height of a roughness of the inner face of the fixing belt, X1 is a length of the fixing belt in a longitudinal direction of the fixing belt, R is a circumference of the fixing belt, G is a specific density of the lubricant, A is an application amount of the lubricant on the one of the slide face of the base of the heater and the inner face of the fixing belt, and V is a volume of the lubricant holder.

This specification further describes an improved image forming apparatus. In one embodiment, the image forming apparatus includes an image bearer that bears an image and the fixing device described above that fixes the image on a recording medium.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
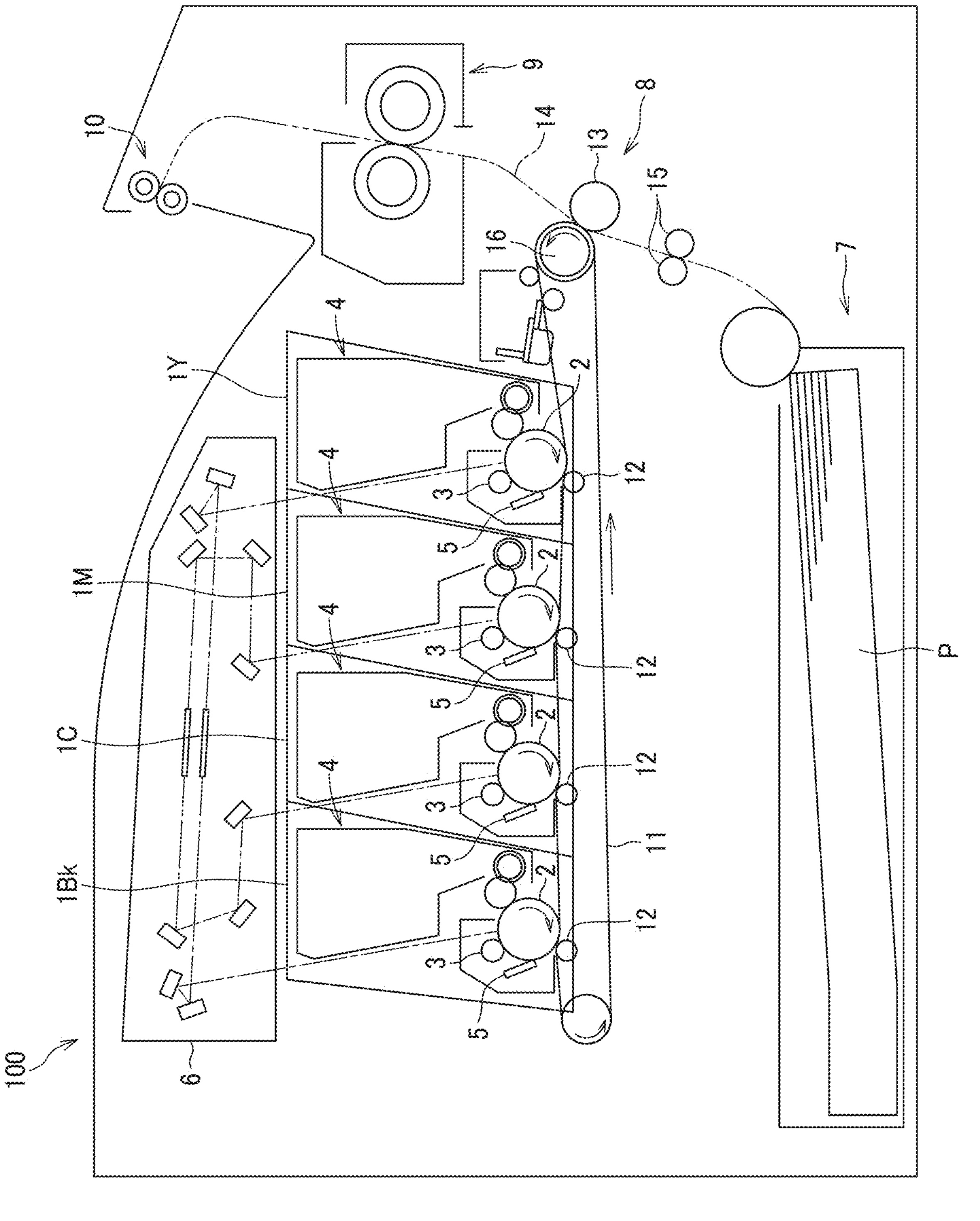
FIG. 1 is a schematic cross-sectional view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Referring to attached drawings, the following describes embodiments of the present disclosure. In the drawings for explaining the embodiments of the present disclosure, identical reference numerals are assigned to elements such as members and parts that have an identical function or an identical shape as long as differentiation is possible and a description of those elements is omitted once the description is provided.

FIG. 1 is a schematic cross-sectional view of an image forming apparatus 100 according to an embodiment of the present disclosure. The image forming apparatus 100 according to the embodiment includes a fixing device 9 that fixes a toner image on a sheet. The fixing device 9 serves as a heating device according to an embodiment of the present disclosure.

As illustrated in FIG. 1, the image forming apparatus 100 includes four image forming units 1Y, 1M, 1C, and 1Bk that are installed in an apparatus body of the image forming apparatus 100 such that the image forming units 1Y, 1M, 1C, and 1Bk are attached to and removed from the apparatus body of the image forming apparatus 100. The image forming units 1Y, 1M, 1C, and 1Bk have a similar construction. However, the image forming units 1Y, 1M, 1C, and 1Bk contain developers in different colors, that is, yellow, magenta, cyan, and black, respectively. The developers correspond to color separation components for a color image. Each of the image forming units 1Y, 1M, 1C, and 1Bk includes a photoconductor 2, a charger 3, a developing device 4, and a cleaner 5. The photoconductor 2 is drum-shaped and serves as an image bearer. The charger 3 charges a surface of the photoconductor 2. The developing device 4 supplies toner as the developer to the surface of the photoconductor 2 to form a toner image. The cleaner 5 cleans the surface of the photoconductor 2.

The image forming apparatus 100 further includes an exposure device 6, a sheet feeder 7, a transfer device 8, the fixing device 9 serving as a heating device, and an output device 10. The exposure device 6 exposes the surface of each of the photoconductors 2 and forms an electrostatic latent image thereon. The image forming apparatus 100 further includes a sheet conveyance path 14. The sheet feeder 7 supplies a sheet P serving as a recording medium to the sheet conveyance path 14. The transfer device 8 transfers the toner image formed on each of the photoconductors 2 onto the sheet P. The fixing device 9 fixes the toner image transferred onto a surface of the sheet P thereon. The output device 10 ejects the sheet P onto an outside of the image forming apparatus 100. Each of the image forming units 1Y, 1M, 1C, and 1Bk, that includes the photoconductor 2 and the charger 3, the exposure device 6, the transfer device 8, and the like construct an image forming device that forms the toner image on the sheet P.

The transfer device 8 includes an intermediate transfer belt 11, four primary transfer rollers 12, and a secondary transfer roller 13. The intermediate transfer belt 11 is an endless belt serving as an intermediate transferor. The primary transfer rollers 12 serve as primary transferors. The secondary transfer roller 13 serves as a secondary transferor. The intermediate transfer belt 11 is stretched taut across a plurality of rollers. The primary transfer rollers 12 transfer yellow, magenta, cyan, and black toner images formed on the photoconductors 2 onto the intermediate transfer belt 11, respectively, thus forming a full color toner image on the intermediate transfer belt 11. The secondary transfer roller 13 transfers the full color toner image formed on the intermediate transfer belt 11 onto the sheet P. The plurality of primary transfer rollers 12 is pressed against the photoconductors 2, respectively, via the intermediate transfer belt 11. Accordingly, the intermediate transfer belt 11 contacts each of the photoconductors 2, forming a primary transfer nip therebetween. On the other hand, the secondary transfer roller 13 is pressed against a roller 16, that is, one of the plurality of rollers across which the intermediate transfer belt 11 is stretched taut, via the intermediate transfer belt 11. Thus, a secondary transfer nip is formed between the secondary transfer roller 13 and the intermediate transfer belt 11.

The sheet conveyance path 14 is provided with a timing roller pair 15 at a position between the sheet feeder 7 and the secondary transfer nip defined by the secondary transfer roller 13.

Referring to FIG. 1, a description is provided of printing processes performed by the image forming apparatus 100 having the construction described above.

When the image forming apparatus 100 receives an instruction to start printing, a driver disposed inside the apparatus body of the image forming apparatus 100 drives and rotates the photoconductor 2 clockwise in FIG. 1 in each of the image forming units 1Y, 1M, 1C, and 1Bk. The charger 3 charges the surface of the photoconductor 2 uniformly at a high electric potential. The exposure device 6 exposes the charged surfaces of the photoconductors 2, respectively, according to image data (e.g., print data) sent from a terminal. Alternatively, if the image forming apparatus 100 is a copier, the exposure device 6 exposes the charged surfaces of the photoconductors 2, respectively, according to image data created by a scanner that reads an image on an original. Accordingly, the electric potential of an exposed portion on the surface of each of the photoconductors 2 decreases, forming an electrostatic latent image on the surface of each of the photoconductors 2. The developing device 4 of each of the image forming units 1Y, 1M, 1C, and 1Bk supplies toner to the electrostatic latent image formed on the photoconductor 2, forming a toner image thereon.

The toner images formed on the photoconductors 2 move and reach the primary transfer nips defined by the primary transfer rollers 12 in accordance with rotation of the photoconductors 2, respectively. The primary transfer rollers 12 transfer the toner images formed on the photoconductors 2 onto the intermediate transfer belt 11 driven and rotated counterclockwise in FIG. 1 successively such that the toner images are superimposed on the intermediate transfer belt 11, thus forming a full color toner image thereon. The full color toner image formed on the intermediate transfer belt 11 is conveyed to the secondary transfer nip defined by the secondary transfer roller 13 in accordance with rotation of the intermediate transfer belt 11. The secondary transfer roller 13 transfers the full color toner image onto a sheet P conveyed through the secondary transfer nip. The sheet P is supplied from the sheet feeder 7. The timing roller pair 15 temporarily halts the sheet P supplied from the sheet feeder 7. Thereafter, the timing roller pair 15 conveys the sheet P to the secondary transfer nip at a time when the full color toner image formed on the intermediate transfer belt 11 reaches the secondary transfer nip. The secondary transfer roller 13 transfers the full color toner image onto the sheet P. Thus, the sheet P bears the full color toner image. After the toner image is transferred onto the intermediate transfer belt 11, the cleaner 5 removes residual toner remained on the photoconductor 2 therefrom.

The sheet P transferred with the full color toner image is conveyed to the fixing device 9 that fixes the full color toner image on the sheet P. Thereafter, the output device 10 ejects the sheet P onto the outside of the image forming apparatus 100, thus finishing a series of printing processes.

A description is provided of a construction of the fixing device 9.

Figure 2:
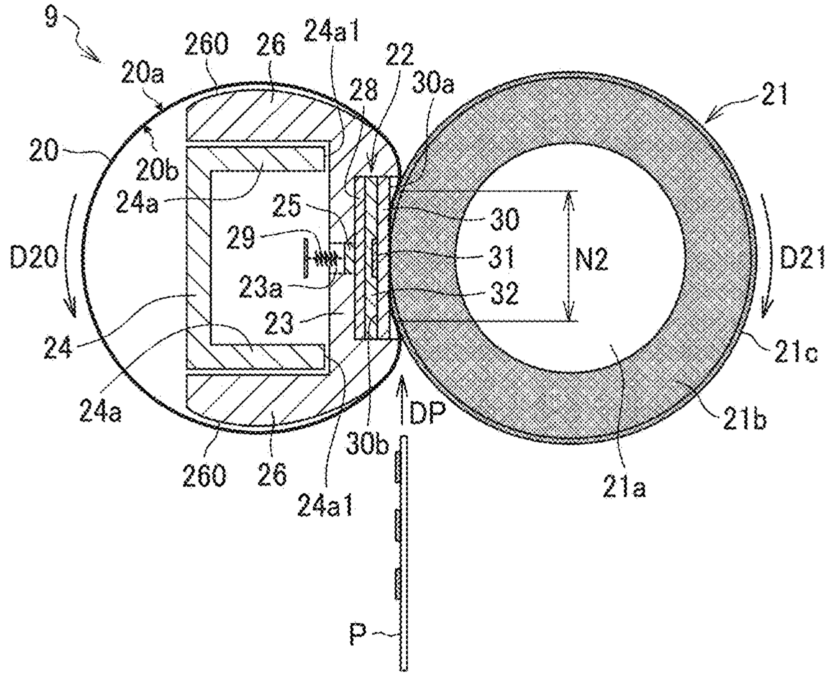
FIG. 2 is a schematic side cross-sectional view of a fixing device according to an embodiment of the present disclosure, that is incorporated in the image forming apparatus depicted in FIG. 1.

As illustrated in FIG. 2, the fixing device 9 according to the embodiment includes a fixing belt 20, a pressure roller 21, a heater 22, a heater holder 23, a stay 24, thermistors 25, and a first thermal conductor 28. The heater holder 23 serves as a holder. The stay 24 serves as a support. The thermistors 25 serve as temperature detectors. The fixing belt 20 is an endless belt. The pressure roller 21 contacts an outer circumferential face **20*a* of the fixing belt 20 to form a fixing nip N2, serving as an outer face nip, between the fixing belt 20 and the pressure roller 21. The heater 22 heats the fixing belt 20. The heater holder 23 holds or supports the heater 22. The stay 24 supports the heater holder 23. Each of the thermistors 25 detects a temperature of the first thermal conductor 28**.

The fixing belt 20, the pressure roller 21 serving as a pressure rotator, the heater 22, the heater holder 23, the stay 24, the first thermal conductor 28, and the like extend in a longitudinal direction that is perpendicular to a paper surface in FIG. 2 and is parallel to a width direction of a sheet P conveyed through the fixing nip N2, a belt width direction of the fixing belt 20, and an axial direction of the pressure roller 21. A fixing device includes a fixing rotator as one example of a rotator incorporated in a heating device (e.g., the fixing device 9) according to an embodiment of the present disclosure. The fixing device 9 according to the embodiment includes the fixing belt 20 as one example of the fixing rotator. As the fixing belt 20 and the pressure roller 21 rotate in rotation directions D20 and D21, respectively, the fixing belt 20 and the pressure roller 21 convey the sheet P in a sheet conveyance direction DP serving as a recording medium conveyance direction.

The fixing belt 20 includes a tubular base layer that is made of polyimide (PI) and has an outer diameter of 25 mm and a thickness in a range of from 50 μm to 75 μm, for example. The fixing belt 20 further includes a release layer serving as an outermost surface layer. The release layer is made of fluororesin, such as perfluoroalkoxy alkane (PFA) and polytetrafluoroethylene (PTFE), and has a thickness in a range of from 7 μm to 20 μm to enhance durability of the fixing belt 20 and facilitate separation of the sheet P and a foreign substance from the fixing belt 20. Optionally, an elastic layer that is made of rubber or the like and has a thickness in a range of from 100 micrometers to 300 micrometers may be interposed between the base layer and the release layer. The base layer of the fixing belt 20 may be made of heat-resistant resin such as polyetheretherketone (PEEK) or metal such as nickel (Ni) and stainless used steel (SUS), instead of polyimide. The fixing belt 20 may include an inner circumferential face 20*b* that is coated with polyimide, PTFE, or the like to produce a sliding layer.

The pressure roller 21 has an outer diameter in a range of from 20 mm to 22 mm, for example. The pressure roller 21 includes a core metal 21*a* as an inner layer, an elastic layer 21*b* disposed on the core metal 21*a*, and a surface layer 21*c* disposed on the elastic layer 21*b*. The core metal 21*a* is solid and made of a conductive material. According to the embodiment, the core metal 21*a* is made of iron. The elastic layer 21*b* is made of a non-conductive material. According to the embodiment, the elastic layer 21*b* has a thickness in a range of from 3.5 mm to 4.0 mm and is made of silicone rubber. Since the elastic layer 21*b* is a non-conductive layer, the elastic layer 21*b* is elastic and stretchy without being added with a material that applies conductivity such as a filler. The surface layer 21*c* is made of fluororesin and has a thickness in a range of from 30 μm to 50 μm.

The fixing device 9 further includes a biasing member that biases and moves the pressure roller 21 toward the fixing belt 20, pressing the pressure roller 21 against the heater 22 via the fixing belt 20. Thus, the fixing nip N2 is formed between the fixing belt 20 and the pressure roller 21. The fixing device 9 further includes a driver that drives and rotates the pressure roller 21. As the pressure roller 21 rotates in the rotation direction D21, the pressure roller 21 drives and rotates the fixing belt 20 in the rotation direction D20.

The heater 22 is a laminated heater that extends in the longitudinal direction thereof throughout an entire span of the fixing belt 20 in the longitudinal direction thereof. The heater 22 includes a base 30 (e.g., a substrate) that is platy, resistive heat generators 31 that are disposed on the base 30, and an insulating layer 32 that coats the resistive heat generators 31. The base 30 has a back face 30*b* that mounts the resistive heat generators 31 and a front face 30*a* (e.g., an opposite face) that is opposite to the back face 30*b*. The front face 30*a* of the base 30 contacts the inner circumferential face 20*b* of the fixing belt 20. The resistive heat generators 31 generate heat that is conducted to the fixing belt 20 through the base 30. According to the embodiment, the base 30 is made of alumina. The heater 22 may contact the inner circumferential face 20*b* of the fixing belt 20 directly or indirectly. For example, the heater 22 may be disposed opposite the inner circumferential face 20*b* of the fixing belt 20 via a conductor such as a slide sheet. As a power supply 200 depicted in FIG. 4 applies an alternating current (AC) voltage to the heater 22, the resistive heat generators 31 generate heat mainly.

The heater holder 23 and the stay 24 are disposed within a loop formed by the fixing belt 20. The stay 24 includes a channel made of metal. The stay 24 has both lateral ends in the longitudinal direction thereof, that are supported by side plates of the fixing device 9, respectively. Since the stay 24 supports the heater holder 23 and the heater 22, in a state in which the pressure roller 21 is pressed against the fixing belt 20, the heater 22 receives pressure from the pressure roller 21 precisely. Thus, the fixing nip N2 is formed between the fixing belt 20 and the pressure roller 21 stably. According to the embodiment, the heater holder 23 has a thermal conductivity that is smaller than a thermal conductivity of the base 30.

Since the heater holder 23 is subject to high temperatures by heat from the heater 22, the heater holder 23 is preferably made of a heat-resistant material. For example, if the heater holder 23 is made of heat-resistant resin having a decreased thermal conductivity, such as liquid crystal polymer (LCP), the heater holder 23 suppresses conduction of heat thereto from the heater 22. Accordingly, the heater 22 heats the fixing belt 20 efficiently.

The fixing device 9 further includes a plurality of guides 26 that is mounted on the heater holder 23 and guides the fixing belt 20. The guides 26 are disposed upstream from and below the heater 22 and disposed downstream from and above the heater 22 in FIG. 2, respectively, in the rotation direction D20 of the fixing belt 20. The plurality of guides 26 disposed upstream and downstream from the heater 22 in the rotation direction D20 of the fixing belt 20 is arranged in the longitudinal direction of the heater 22 with a gap between the adjacent guides 26. Each of the guides 26 is substantially fan-shaped. Each of the guides 26 includes a fixing belt opposed face 260 that is disposed opposite the inner circumferential face 20*b* of the fixing belt 20 and defines an arc or a projecting curved face that extends in a circumferential direction of the fixing belt 20.

The heater holder 23 includes a plurality of openings 23*a* arranged in the longitudinal direction of the heater holder 23. Each of the openings 23*a* is a slot penetrating through the heater holder 23 in a thickness direction thereof. The thermistors 25 and thermostats described below are placed in the openings 23*a*, respectively. The fixing device 9 further includes springs 29 that bias and press the thermistors 25 and the thermostats against a back face of the first thermal conductor 28. Alternatively, each of the first thermal conductor 28 and a second thermal conductor described below may also include an opening similarly so that the thermistors 25 and the thermostats are pressed against a back face of the insulating layer 32 of the heater 22 through the openings.

The first thermal conductor 28 is made of a material having a thermal conductivity greater than a thermal conductivity of the base 30. According to the embodiment, the first thermal conductor 28 is a plate made of aluminum. Alternatively, the first thermal conductor 28 may be made of copper, silver, graphene, or graphite, for example. Since the first thermal conductor 28 is platy, the first thermal conductor 28 improves accuracy of positioning of the heater 22 with respect to the heater holder 23 and the first thermal conductor 28. The first thermal conductor 28 contacts the insulating layer 32 of the heater 22.

A description is provided of a method for calculating the thermal conductivity described above.

A thermal diffusivity of a target object was measured and a thermal conductivity was calculated based on the thermal diffusivity.

The thermal diffusivity was measured with a thermal diffusivity-thermal conductivity measurement device, ai-Phase Mobile 1u, manufactured by ai-Phase Co., Ltd.

The thermal diffusivity was converted into the thermal conductivity based on a density and a specific heat capacity. The density was measured with a dry-process pycnometer, Accupyc 1330, manufactured by Shimadzu Corporation. The specific heat capacity was measured with a differential scanning calorimeter, DSC-60, manufactured by Shimadzu Corporation. Sapphire was used as a reference material having a known specific heat capacity. According to an embodiment, the specific heat capacity was measured five times to obtain an average at 50 degrees Celsius. Based on a density p, a specific heat capacity S, and a thermal diffusivity a obtained by the above-described measurement of the thermal diffusivity, a thermal conductivity k is obtained by a formula (1) below.

$$\lambda=\rho\times S\times\alpha\ldots \quad (1)$$

In the fixing device 9 according to the embodiment, when printing starts, the driver drives and rotates the pressure roller 21 and the fixing belt 20 starts rotation in accordance with rotation of the pressure roller 21. Since the inner circumferential face 20*b* of the fixing belt 20 is contacted and guided by the fixing belt opposed face 260 of each of the guides 26, the fixing belt 20 rotates stably and smoothly. Additionally, as power is supplied to the resistive heat generators 31 of the heater 22, the heater 22 heats the fixing belt 20. In a state in which the temperature of the fixing belt 20 reaches a predetermined target temperature (e.g., a fixing temperature), as a sheet P bearing an unfixed toner image is conveyed through the fixing nip N2 formed between the fixing belt 20 and the pressure roller 21 as illustrated in FIG. 2, the fixing belt 20 and the pressure roller 21 fix the unfixed toner image on the sheet P under heat and pressure. The fixing belt 20 serves as a heated member that is heated by the heater 22.

A detailed description is provided of a construction of the heater 22 of the fixing device 9.

Figure 3:
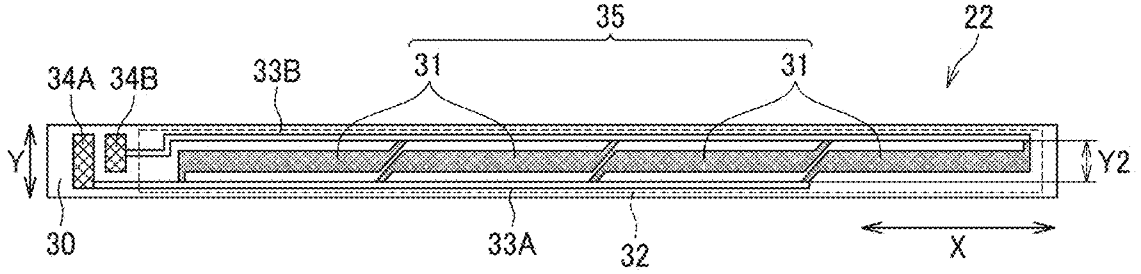
FIG. 3 is a plan view of a heater incorporated in the fixing device depicted in FIG. 2, illustrating resistive heat generators incorporated in the heater.

FIG. 3 is a plan view of the heater 22 according to the embodiment. FIG. 3 illustrates conductors such as the resistive heat generators 31 that are disposed on the left of the base 30 in FIG. 2. In a description below, the base 30 has the front face 30*a* and the back face 30*b*. The back face 30*b* is opposite to the front face 30*a* and is a left face of the base 30 in FIG. 2. The front face 30*a* is opposite to the back face 30*b* and is disposed opposite the fixing nip N2 and a slide nip described below.

As illustrated in FIG. 3, the base 30 that is platy has the back face 30*b* (e.g., a surface) depicted in FIG. 2 that mounts the plurality of resistive heat generators 31 (e.g., the four resistive heat generators 31). The back face 30*b* also mounts feeders 33A and 33B serving as conductors, and electrodes 34A and 34B serving as a first electrode and a second electrode, respectively. The number of the resistive heat generators 31 is not limited to four.

FIG. 3 illustrates a longitudinal direction X (e.g., a horizontal direction in FIG. 3) that defines the longitudinal direction of the heater 22 and the like and an arrangement direction in which the plurality of resistive heat generators 31 is arranged. The arrangement direction is parallel to the longitudinal direction of the fixing belt 20 and the axial direction of the pressure roller 21. FIG. 3 illustrates a short direction Y (e.g., a vertical direction in FIG. 3) that is parallel to the sheet conveyance direction DP serving as the recording medium conveyance direction depicted in FIG. 2. The short direction Y is a short direction of the heater 22. The short direction Y is an orthogonal direction that intersects the arrangement direction in which the resistive heat generators 31 are arranged. According to the embodiment, the short direction Y is perpendicular to the arrangement direction in which the resistive heat generators 31 are arranged. The short direction Y is different from a thickness direction of the base 30. The longitudinal direction X and the short direction Y are hereinafter also referred to as the longitudinal direction and the short direction, respectively.

The heater 22 includes a heat generation portion 35 that is divided into the plurality of resistive heat generators 31 arranged in the longitudinal direction X of the heater 22. The resistive heat generators 31 are electrically connected in parallel to a pair of electrodes 34A and 34B through the feeders 33A and 33B. The electrodes 34A and 34B are mounted on one lateral end (e.g., a left end in FIG. 3) of the base 30 in the longitudinal direction X thereof. Each of the feeders 33A and 33B is made of a conductor having a resistance value smaller than a resistance value of the resistive heat generator 31. The adjacent resistive heat generators 31 define a gap therebetween, that is 0.2 mm or greater, preferably 0.4 mm or greater, in view of ensuring insulation between the adjacent resistive heat generators 31. If the gap between the adjacent resistive heat generators 31 is excessively great, the fixing belt 20 is subject to temperature decrease at an opposed portion thereof that is disposed opposite the gap. Hence, the gap is 5 mm or smaller, preferably 1 mm or smaller, in view of suppressing uneven temperature of the fixing belt 20 in the longitudinal direction thereof.

The resistive heat generators 31 are made of a material having a positive temperature coefficient (PTC) property that is characterized in that the resistance value increases, that is, a heater output decreases, as the temperature increases. The resistive heat generator 31 has a temperature coefficient of 500 ppm, for example.

Since the resistive heat generators 31 have the PTC property and the heat generation portion 35 is divided into the plurality of resistive heat generators 31 in the longitudinal direction X of the heater 22, the heater 22 prevents overheating of the fixing belt 20 when sheets P having a decreased size are conveyed over the fixing belt 20. For example, if a sheet P having a decreased width that is smaller than an entire length of the heat generation portion 35 in the longitudinal direction X of the heater 22 is conveyed through the fixing nip N2, since the sheet P does not draw heat from the fixing belt 20 in an outboard span that is outboard from the sheet P in the longitudinal direction X of the fixing belt 20, the resistive heat generators 31 in the outboard span are subject to temperature increase. Since a constant voltage is applied to the resistive heat generators 31, when the temperature of the resistive heat generators 31 in the outboard span increases and the resistance value thereof increases, conversely, an output (e.g., a heat generation amount) of heat from the resistive heat generators 31 decreases relatively, suppressing temperature increase of the resistive heat generators 31 that are disposed in both lateral end spans of the heat generation portion 35 in the longitudinal direction X thereof. Additionally, the plurality of resistive heat generators 31 is electrically connected in parallel, suppressing temperature increase in a non-conveyance span where the sheet P is not conveyed over the fixing belt 20 while retaining the printing speed. Alternatively, the heat generation portion 35 may include heat generators other than the resistive heat generators 31 having the PTC property. The resistive heat generators 31 may be arranged in a plurality of columns in the short direction Y of the heater 22.

For example, the resistive heat generator 31 is produced as below. Silver-palladium (AgPd), glass powder, and the like are mixed into paste. The paste coats the base 30 by screen printing or the like. Thereafter, the base 30 is subject to firing. According to the embodiment, the resistive heat generator 31 has a resistance value of 80Ω at an ambient temperature. Alternatively, the resistive heat generator 31 may be made of a resistive material such as a silver alloy (AgPt) and ruthenium oxide ($RuO_2$). The feeders 33A and 33B and the electrodes 34A and 34B are made of a material prepared with silver (Ag) or silver-palladium (AgPd) by screen printing or the like. Each of the feeders 33A and 33B is made of a conductor having a resistance value smaller than a resistance value of the resistive heat generator 31.

The base 30 is preferably made of ceramics, such as alumina and aluminum nitride, or a nonmetallic material, such as glass and mica, having an enhanced heat resistance and an enhanced insulation. According to the embodiment, the base 30 is made of alumina and has a short width of 8 mm, a longitudinal length of 270 mm, and a thickness of 1.0 mm. Alternatively, the base 30 may include a conductive layer made of metal or the like and an insulating layer disposed on the conductive layer. The metal of the base 30 is preferably aluminum, stainless steel, or the like that is available at reduced costs. The base 30 made of a stainless steel plate suppresses breakage due to thermal stress. In order to improve evenness of heat conducted from the heater 22 so as to enhance quality of an image formed on a sheet P, the base 30 may be made of a material that has an increased thermal conductivity such as copper, graphite, and graphene.

The insulating layer 32 is made of heat-resistant glass and has a thickness of 75 μm, for example. The insulating layer 32 covers the resistive heat generators 31 and the feeders 33A and 33B and insulates and protects the resistive heat generators 31 and the feeders 33A and 33B.

Figure 4:
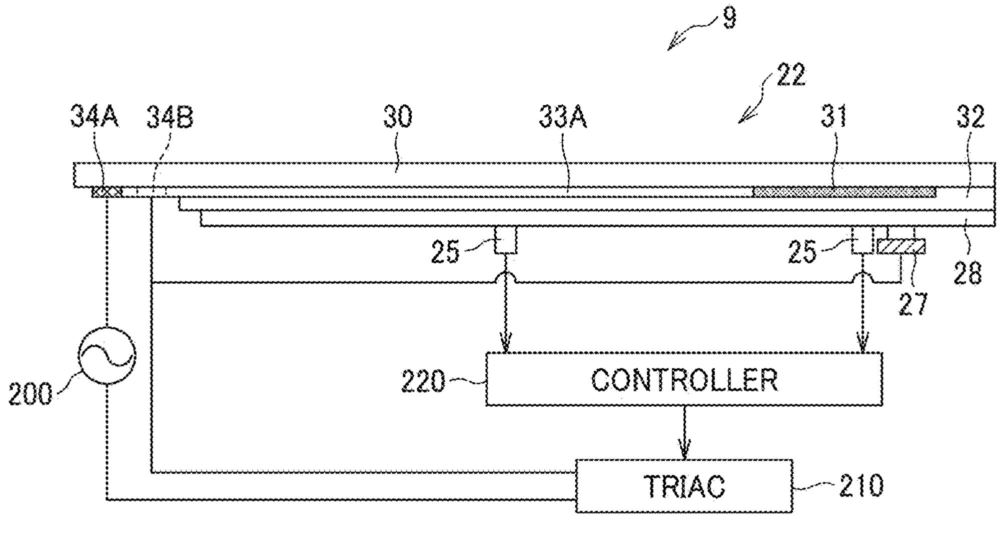
FIG. 4 is a diagram of a power supply circuit that supplies power to the heater depicted in FIG. 3.

FIG. 4 is a diagram of the heater 22 according to the embodiment, illustrating a power supply circuit that supplies power to the heater 22.

As illustrated in FIG. 4, according to the embodiment, the power supply circuit for supplying power to the resistive heat generators 31 includes the alternating current power supply 200 that is electrically connected to the electrodes 34A and 34B of the heater 22. The power supply circuit further includes a triac 210 that controls an amount of power supplied to the resistive heat generators 31. The power supply circuit further includes a controller 220 that controls the amount of power supplied to each of the resistive heat generators 31 through the triac 210 based on temperatures of the resistive heat generators 31, that are detected by the thermistors 25, respectively. The controller 220 includes a microcomputer that includes a central processing unit (CPU), a read only memory (ROM), a random access memory (RAM), and an input-output (I/O) interface.

According to the embodiment, the thermistors 25 are disposed opposite a center span of the heater 22 in the longitudinal direction thereof, that is, a minimum sheet conveyance span where a minimum size sheet P available in the fixing device 9 is conveyed, and one lateral end span of the heater 22 in the longitudinal direction thereof, respectively. The fixing device 9 further includes a thermostat 27 that is disposed at one lateral end of the heater 22 in the longitudinal direction thereof. The thermostat 27 serves as a power breaker that interrupts supplying power to the resistive heat generators 31 when a temperature of the resistive heat generator 31 is a predetermined temperature or higher. The thermistors 25 and the thermostat 27 contact the first thermal conductor 28 to detect a temperature of the first thermal conductor 28.

Figure 5:
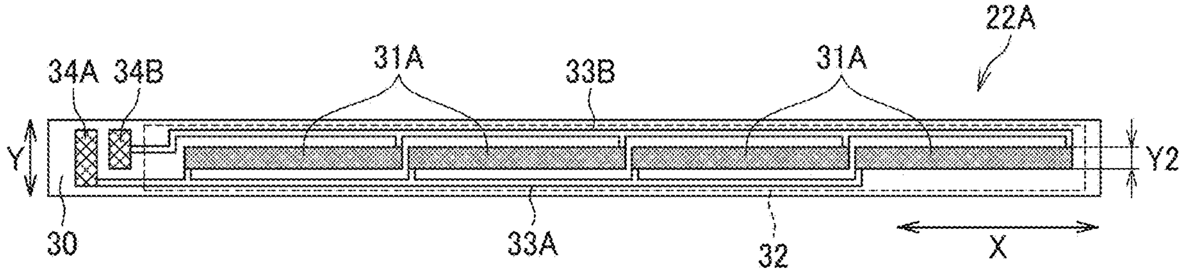
FIG. 5 is a plan view of a heater including resistive heat generators having a shape that is different from a shape of the resistive heat generators of the heater depicted in FIG. 3.
Figure 6:
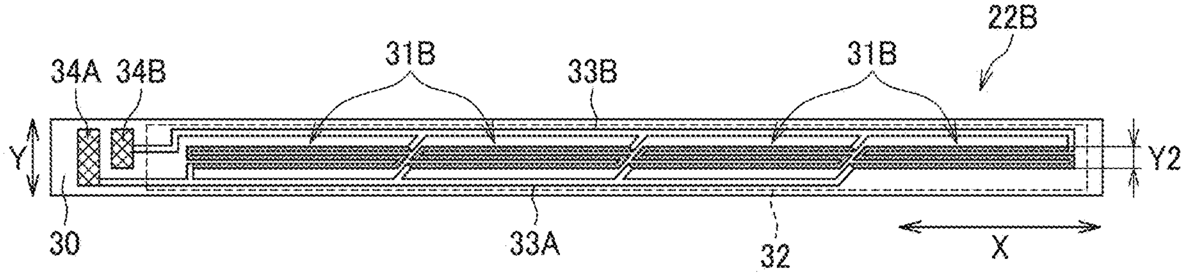
FIG. 6 is a plan view of a heater including resistive heat generators having a shape that is different from the shapes of the resistive heat generators of the heaters depicted in FIGS. 3 and 5.

According to the embodiment, the electrodes 34A and 34B are disposed in an identical lateral end span of the heater 22 in the longitudinal direction thereof. Alternatively, the electrodes 34A and 34B may be disposed in one lateral end span and another lateral end span of the heater 22 in the longitudinal direction thereof, respectively. The resistive heat generator 31 has shapes that are not limited to a shape according to the embodiment. FIG. 5 illustrates a heater 22A that includes resistive heat generators 31A each of which is rectangular. FIG. 6 illustrates a heater 22B that includes resistive heat generators 31B each of which includes a linear portion. The linear portion turns to define a parallelogram substantially. As illustrated in FIG. 5, the heater 22A includes an extension that extends from the resistive heat generator 31A having a block shape to the feeder 33A or 33B in the short direction Y. The extension may be a part of the resistive heat generator 31A or may be made of a material equivalent to a material of the feeder 33A or 33B.

Figure 7:
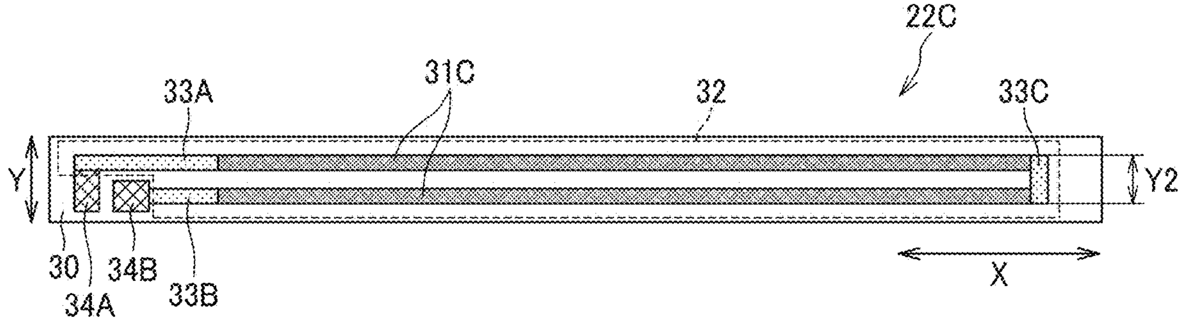
FIG. 7 is a plan view of a heater including resistive heat generators having a shape that is different from the shapes of the resistive heat generators of the heaters depicted in FIGS. 3, 5, and 6.

Alternatively, a heater may include a plurality of resistive heat generators that is not divided in a longitudinal direction of the heater. For example, FIG. 7 illustrates a heater 22C that includes two resistive heat generators 31C that are extended in the longitudinal direction X of the heater 22C and are connected in series. The two resistive heat generators 31C are connected to the electrodes 34A and 34B through the feeders 33A and 33B, respectively, at one lateral end of each of the resistive heat generators 31C in the longitudinal direction X thereof. The two resistive heat generators 31C are connected in series through a feeder 33C at another lateral end of each of the resistive heat generators 31C in the longitudinal direction X thereof.

A description is provided of a construction of the heater 22C depicted in FIG. 7 as one example.

The heater 22C has dimensions in the short direction Y, that are defined by a dimension of 8.0 mm of the base 30, a dimension of 1.5 mm of each of the resistive heat generators 31C, and a dimension of 3.0 mm of a gap between the resistive heat generators 31C. The heater 22C has a heating region having a width Y2 of 6.0 mm in the short direction Y of the heater 22C. The heating region of the heater 22C defines a main heat generation region thereof where the resistive heat generators 31C are disposed. The heating region encompasses the gap between the resistive heat generators 31C.

Figure 8:
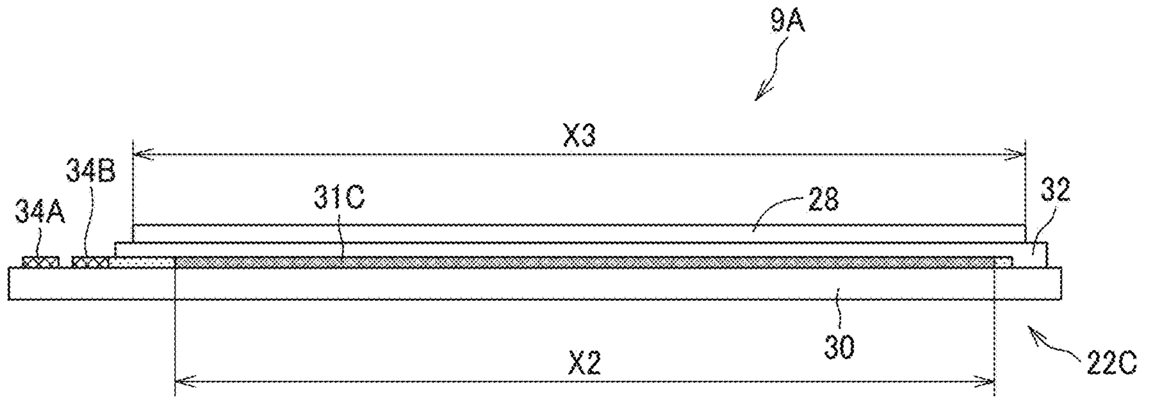
FIG. 8 is a diagram of the heater depicted in FIG. 7 and a first thermal conductor that contacts the heater, illustrating lengths of the heater and the first thermal conductor, respectively.

As illustrated in FIG. 8, the heating region of the heater 22C has a length X2 of 216 mm in the longitudinal direction X of the heater 22C. The first thermal conductor 28 has a thickness of 0.3 mm, a length X3 of 222 mm in the longitudinal direction of the first thermal conductor 28, and a width of 10 mm in a short direction of the first thermal conductor 28. The length X3 of the first thermal conductor 28 in the longitudinal direction thereof is greater than the length X2 of the heating region of the heater 22C in the longitudinal direction X thereof. Thus, the first thermal conductor 28 covers an entirety of the heating region of the heater 22C. Accordingly, the first thermal conductor 28 prevents the resistive heat generators 31C of the heater 22C from overheating locally, thus preventing breakage of the heater 22C.

A description is provided of a construction of a comparative fixing device.

The comparative fixing device includes a fixing belt including a rough surface portion disposed on an inner circumferential face of the fixing belt in a center span of the fixing belt in an axial direction thereof. The rough surface portion improves retention of a lubricant by the fixing belt.

However, the comparative fixing device may suffer from degradation in retention of the lubricant due to an application amount of the lubricant applied between the fixing belt, serving as a rotator, and a heater, a construction of the heater, and a construction of a holder that holds the heater.

Figure 9:
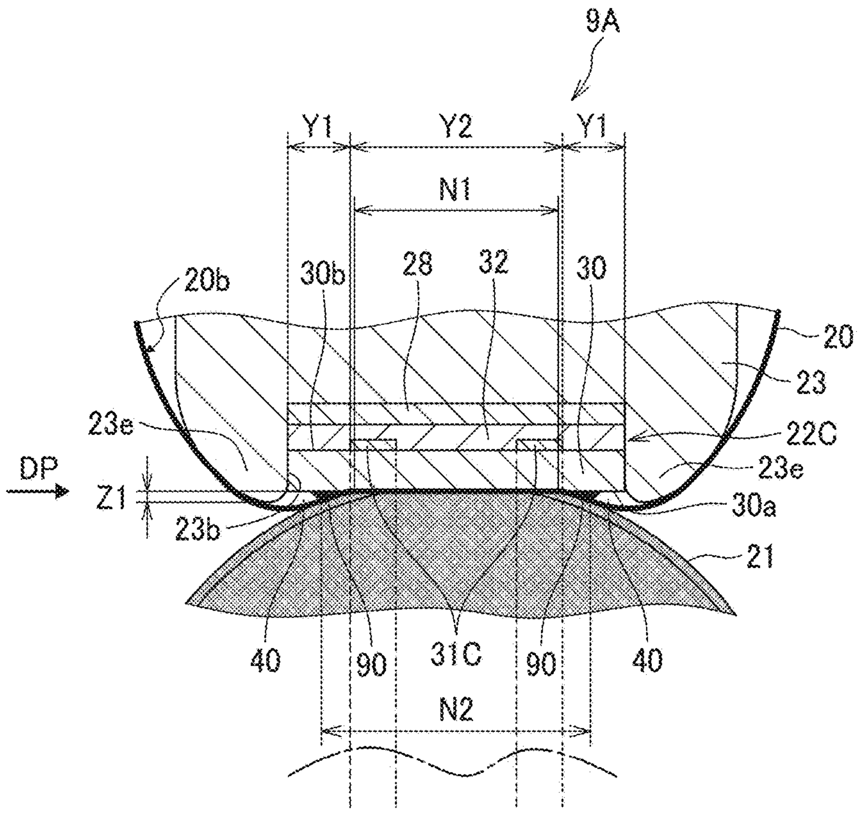
FIG. 9 is a cross-sectional view of a fixing device according to another embodiment of the present disclosure, that is installable in the image forming apparatus depicted in FIG. 1, illustrating a slide nip and a fixing nip of the fixing device.

FIG. 9 illustrates a fixing device 9A that includes the fixing belt 20 that contacts the pressure roller 21 to form the fixing nip N2 that extends in the sheet conveyance direction DP (e.g., a horizontal direction in FIG. 9). The inner circumferential face 20*b* of the fixing belt 20 contacts the heater 22C to form a slide nip N1 that extends in the sheet conveyance direction DP. FIG. 9 illustrates, in a lower part in FIG. 9, a temperature profile of the front face 30*a*, serving as the slide face, of the base 30 in the sheet conveyance direction DP with an alternate long and short dash line.

The inner circumferential face 20*b* of the fixing belt 20 slides over the heater 22C with constant pressure therebetween at the slide nip N1. For example, as a measurement method for measuring the slide nip N1, a lead-free mold inspection agent, Shinmyotan N-Red, available from Nakatani Co., Ltd. is applied on a surface of the heater 22C and the pressure roller 21 is pressed against the fixing belt 20. While the fixing belt 20 has a surface temperature of 190 degrees Celsius, the fixing device 9A is driven for ten minutes. Thereafter, the fixing device 9A is dismantled. The surface of the heater 22C is checked and a peel-off portion of the heater 22C, where the Shinmyotan is peeled off, is observed. The peel-off portion is photographed. Based on a width of the heater 22C in the short direction Y thereof, that has been measured, the peel-off portion is measured as the slide nip N1.

In the fixing device 9A incorporating the heater 22C, as the fixing belt 20 rotates, the inner circumferential face 20*b* of the fixing belt 20 may slide over the front face 30*a*, serving as the slide face, of the base 30 of the heater 22C with sliding friction, resulting abrasion of the fixing belt 20. In order to suppress the sliding friction and the abrasion of the fixing belt 20, a lubricant is applied onto the inner circumferential face 20*b* of the fixing belt 20 or the front face 30*a* (e.g., the slide face) of the base 30, over which the fixing belt 20 slides. According to the embodiment, fluorine grease is used as the lubricant. The fluorine grease is hereinafter also referred to as the grease.

According to the embodiment, the heater holder 23 includes a recess 23*b* that holds the heater 22C. The heater holder 23 further includes protrusions 23*e* disposed at both ends of the heater holder 23 in the sheet conveyance direction DP, respectively. The protrusions 23*e* protrude beyond the base 30 of the heater 22C held inside the recess 23*b* toward the fixing belt 20. The inner circumferential face 20*b* of the fixing belt 20 slides over the protrusions 23*e*.

The pressure roller 21 presses the fixing belt 20 against the front face 30*a* of the base 30. Accordingly, in a center span of the heater 22C in the short direction Y thereof (e.g., the horizontal direction in FIG. 9), the inner circumferential face 20*b* of the fixing belt 20 contacts the front face 30*a* of the base 30, thus forming the slide nip N1. The fixing device 9A further includes grease reservoirs 40 disposed opposite both ends of the base 30 in the short direction Y of the heater 22C, respectively. Each of the grease reservoirs 40 defines space produced between the front face 30*a* of the base 30 and the inner circumferential face 20*b* of the fixing belt 20. Each of the grease reservoirs 40 serves as a lubricant holder. The grease reservoirs 40 store the grease. According to the embodiment, each of the grease reservoirs 40 stores grease 90 at a portion of the grease reservoir 40, that abuts on the slide nip N1. The grease 90 accumulated in each of the grease reservoirs 40 is supplied to the slide nip N1 little by little. Thus, the grease 90 retains proper sliding of the inner circumferential face 20*b* of the fixing belt 20 over the front face 30*a* of the base 30 for an extended period of time.

In order to attain proper sliding of the inner circumferential face 20*b* of the fixing belt 20 over the base 30 of the heater 22C, an amount of the grease 90 interposed between the fixing belt 20 and the front face 30*a* of the base 30 of the heater 22C and a viscosity of the grease 90 are retained at appropriate values, respectively. For example, if the amount of the grease 90 decreases excessively, the grease 90 does not attain proper sliding of the fixing belt 20 over the heater 22C. Conversely, if the amount of the grease 90 increases excessively, the grease 90 may have an excessively increased film thickness, increasing a slide load imposed on the fixing belt 20 and increasing an amount of the grease 90 that leaks from each lateral end of the fixing belt 20 in the longitudinal direction thereof. Thus, neither an excessively increased viscosity nor an excessively decreased viscosity of the grease 90 attains proper sliding of the fixing belt 20 over the heater 22C. Additionally, surface roughness of the inner circumferential face 20*b* of the fixing belt 20 and the front face 30*a* of the base 30 of the heater 22C, that retain the grease 90, changes capacity of the inner circumferential face 20*b* and the front face 30*a* for retaining the grease 90.

According to the embodiment, the base 30 is made of ceramics having enhanced smoothness. The front face 30*a* has an arithmetic average roughness Ra of 0.2 μm or smaller. Alternatively, the front face 30*a* may be coated with thin film made of polyimide or a glass layer. Accordingly, the inner circumferential face 20*b* of the fixing belt 20 slides over the front face 30*a* of the base 30 without abrasion. If the front face 30*a* is smooth like in the embodiment, roughness of the inner circumferential face 20*b* of the fixing belt 20 affects retention of the grease 90 substantially. For example, the inner circumferential face 20*b* of the fixing belt 20 includes recesses that retain PTFE as a thickener for the fluorine grease. Accordingly, base oil of the fluorine grease is supplied to the slide nip N1 over time, preventing shortage of oil film.

According to the embodiment, the grease 90 is supplied to the inner circumferential face 20*b* of the fixing belt 20 in an amount that is great enough to fill the recesses. For example, the roughness on the inner circumferential face 20*b* of the fixing belt 20 has a height H. The fixing belt 20 has the length X1 in the longitudinal direction of the fixing belt 20. The fixing belt 20 has a circumference R. The grease 90 has a specific density G. The grease 90 may move round to a back face of the heater 22C or may adhere to the heater holder 23. Hence, an application amount A of the grease 90 satisfies a formula (2) below.

$$H \times X1 \times R \times G \leq A \ldots \quad (2)$$

The height H of the roughness on the inner circumferential face 20*b* of the fixing belt 20 is obtained by measuring a surface profile with a laser microscope VK series available from Keyence Corporation and calculating a ten-point mean roughness of peak-to-peak values. The ten-point mean roughness is calculated as below. Measurement is performed on ten points on the inner circumferential face 20*b* of the fixing belt 20. For example, the ten points include one point at a center position on the fixing belt 20 in the longitudinal direction thereof, two points separated from the center position by plus and minus 50 mm in the longitudinal direction of the fixing belt 20, respectively, and two points separated from the center position by plus and minus 100 mm in the longitudinal direction of the fixing belt 20, respectively. The above described five points are located on two points shifted from each other in the circumferential direction of the fixing belt 20. The peak-to-peak values obtained at the ten points are averaged. For example, according to the embodiment, the roughness has a height of 1.67 μm.

The fixing belt 20 according to the embodiment has an outer diameter of 25 mm. The base layer of the fixing belt 20 has a thickness of 60 μm. The elastic layer of the fixing belt 20, that is made of silicone rubber, has a thickness of 250 μm. The release layer of the fixing belt 20, that is made of PFA, has a thickness of 12 μm. The fixing belt 20 has the length X1 of 234 mm in the longitudinal direction of the fixing belt 20. The fixing belt 20 has the circumference R (e.g., an inner circumference) of 76.5 mm. The inner circumferential face 20*b* of the fixing belt 20 has an entire area of 17,901 $mm^2$ obtained by multiplying 234 mm by 76.5 mm. The fluorine grease has the specific density G of 2.0 $kg/m^3$.

Based on the above-described values, according to the formula (2), the application amount A of the grease 90 is approximately $6\times10^{-5}$ g or greater. Accordingly, the recesses on the inner circumferential face 20*b* of the fixing belt 20, especially, the grease reservoirs 40, retain the grease 90. Hence, the grease 90 in a proper amount is supplied to a gap between the front face 30*a* of the base 30 and the inner circumferential face 20*b* of the fixing belt 20 over time, preventing shortage of the oil film.

The application amount A of the grease 90 is not greater than a volume of the grease reservoirs 40 disposed upstream and downstream from the slide nip N1 in the sheet conveyance direction DP, respectively. If the grease 90 is applied in an amount greater than a volume of the space of the grease reservoirs 40, the grease 90 may leak from each lateral end of the fixing belt 20 in the longitudinal direction thereof. Sliding friction may increase due to an excessive amount of the grease 90. Each of the grease reservoirs 40 defines space that is produced between the inner circumferential face 20*b* of the fixing belt 20 and the front face 30*a* of the base 30. The space has a width Y1 and is disposed outboard from the slide nip N1 in the sheet conveyance direction DP as illustrated in FIG. 9.

Each of the grease reservoirs 40 disposed outboard from the slide nip N1 in the sheet conveyance direction DP has the width Y1. Each of the protrusions 23*e* of the heater holder 23 protrudes beyond the front face 30*a* of the base 30 for a protrusion amount Z1. Hence, the application amount A of the grease 90 satisfies a formula (3) below. According to the formula (3), the width Y1 multiplied by 2 is multiplied by the protrusion amount Z1 and the length X1 of the fixing belt 20 in the longitudinal direction thereof to obtain a volume V in a unit of $m^3$ of the grease reservoirs 40.

$$A \leq Y1\times2\times Z1\times X1\times \ldots \quad (3)$$

As described above, the slide nip N1 has a width of 5.1 mm. The heater 22C has a width of 8.0 mm in the short direction Y thereof. Hence, the width Y1 multiplied by 2 is 2.9 mm. The protrusion 23*e* has a height of 1.57 mm. The first thermal conductor 28 has a thickness of 0.3 mm. The heater 22C has a thickness of 1.07 mm. Hence, the protrusion amount Z1 is 0.2 mm. The length X1 of the fixing belt 20 in the longitudinal direction thereof is 234 mm. Thus, according to the formula (3), the volume V of the grease reservoir 40 is 135.72 $mm^3$ that is obtained by multiplying 2.9 mm by 0.2 mm and 234 mm. The volume V is multiplied by the specific density G of the grease 90 to obtain $2.7\times10^{-4}$ g. The application amount A of the grease 90 is not greater than $2.7\times10^{-4}$ g. Thus, the grease 90 does not leak from each lateral end of the fixing belt 20 in the longitudinal direction thereof. Further, the grease 90 prevents increase in initial torque of the fixing belt 20 when driving of the fixing belt 20 starts and prevents resultant slippage of the fixing belt 20.

A description is provided of one example of a calculation method for calculating the protrusion amount Z1 (e.g., a height) of the protrusion 23*e*.

The heater 22C and the first thermal conductor 28 are removed from the fixing device 9A. In a state in which the pressure roller 21 presses the fixing belt 20 against the heater 22C, a height from a bottom face of the recess 23*b* to a peak of the protrusion 23*e* that protrudes toward the fixing belt 20 is measured with a height gauge. The bottom face of the recess 23*b*, that is measured, is horizontal with respect to a floor. The heights are measured at an upstream position and a downstream position on the recess 23*b* in the sheet conveyance direction DP, respectively, and averaged to obtain an average. A thickness of the heater 22C and a thickness of the first thermal conductor 28, that are measured, are subtracted from the average to obtain the protrusion amount Z1 (e.g., the height) of the protrusion 23*e*.

Since the back face 30*b* of the base 30 mounts the resistive heat generators 31C, compared to a configuration in which the front face 30*a* of the base 30 mounts the resistive heat generators 31C, the heater 22C suppresses temperature increase of the front face 30*a* of the base 30, that serves as the slide face over which the fixing belt 20 slides. Accordingly, the heater 22C prevents the resistive heat generators 31C from heating the grease 90 accumulated in the grease reservoirs 40, suppressing decrease in viscosity of the grease 90 and volatilization of fluorine oil. Hence, the grease reservoirs 40 retain the grease 90 in a proper condition and supply a base oil component of the grease 90 to the slide nip N1. Consequently, the inner circumferential face 20*b* of the fixing belt 20 slides over the heater 22C properly.

As described above, the back face 30*b* of the base 30 mounts the resistive heat generators 31C. Additionally, the application amount A of the grease 90 (e.g., the fluorine grease) is in a range from a lower limit to an upper limit of the values described above. Accordingly, the inner circumferential face 20*b* of the fixing belt 20 slides over the heater 22C properly for an extended period of time. Consequently, the inner circumferential face 20*b* of the fixing belt 20 slides over the front face 30*a* of the base 30 without abrasion and noise. Further, the grease 90 prevents slippage of the fixing belt 20 while the fixing belt 20 rotates.

The first thermal conductor 28 is disposed opposite the back face 30*b* of the base 30, preventing local overheating in an opposed portion of the heater 22C, that is disposed opposite the resistive heat generators 31C. Accordingly, the first thermal conductor 28 prevents the heater 22C from heating the grease 90 accumulated in the grease reservoirs 40, suppressing decrease in viscosity of the grease 90 and volatilization of the fluorine oil. Hence, the grease reservoirs 40 supply the grease 90 in the proper condition to the slide nip N1, improving sliding of the inner circumferential face 20*b* of the fixing belt 20 over the heater 22C.

The resistive heat generators 31C are disposed in the slide nip N1 in the sheet conveyance direction DP. Thus, the resistive heat generators 31C do not heat the grease 90 accumulated in the grease reservoirs 40 disposed outside the slide nip N1, suppressing decrease in viscosity of the grease 90 and volatilization of the fluorine oil. Hence, the grease reservoirs 40 supply the grease 90 in the proper condition to the slide nip N1, causing the inner circumferential face 20*b* of the fixing belt 20 to slide over the heater 22C properly.

According to the embodiment, the application amount A of the grease 90 is 0.15 g. Even if the application amount A of the grease 90 has an error of approximately plus or minus 30 percent, the application amount A of the grease 90 is preferably in the range from the lower limit to the upper limit of the values described above.

The fluorine grease is preferably used as the lubricant like in the embodiment. Accordingly, the thickener made of PTFE attains viscosity of the grease 90, preventing shortage of the oil film between the fixing belt 20 and the heater 22C and retaining the lubricant. Consequently, the fixing belt 20 slides over the heater 22C properly for an extended period of time.

According to the embodiment, the fixing belt 20 may include the elastic layer. Hence, the fixing belt 20 has an increased rigidity, decreasing the slide nip N1. The fixing belt 20 may have an outer diameter that is smaller than an outer diameter of the pressure roller 21. Accordingly, the fixing belt 20 decreases the slide nip N1.

The front face 30*a*, serving as the slide face, of the base 30 of the heater 22C preferably has a surface roughness of 0.2 μm or smaller. Since the front face 30*a* of the base 30 has decreased capacity for retaining the grease 90, in order to suppress sliding friction with which the inner circumferential face 20*b* of the fixing belt 20 slides over the front face 30*a* of the base 30, the front face 30*a* preferably has a decreased surface roughness. The inner circumferential face 20*b* of the fixing belt 20 preferably has a surface roughness of 0.5 μm or smaller. The inner circumferential face 20*b* of the fixing belt 20, that has the decreased surface roughness, prevents the roughness on the inner circumferential face 20*b* of the fixing belt 20 from trapping the grease 90 and inhibiting the grease 90 from being supplied to a gap between the inner circumferential face 20*b* of the fixing belt 20 and the heater 22C.

The surface roughness described above is measured with a surface roughness tester, Surfcom 1400A, available from Tokyo Seimitsu Co., Ltd. by a method conforming to JIS B0601-2001 of the Japanese Industrial Standards. The arithmetic average roughness Ra is measured under a measurement condition of an evaluation length Ln of 1.5 mm, a reference length Lr of 0.25 mm, and a cutoff value of 0.8 mm.

In order to improve quality of a toner image fixed on a sheet P and extend a life of the fixing device 9A, the fixing belt 20 improves rigidity by incorporating a thickened base layer, a metallic base layer, a thickened elastic layer, or the like. However, if the fixing belt 20 has an increased rigidity, the fixing belt 20 is deformed by pressure from the pressure roller 21 with a decreased deformation amount, decreasing the slide nip N1 compared to the fixing nip N2. If the fixing belt 20 has a decreased outer diameter or has an outer diameter that is smaller than an outer diameter of the pressure roller 21, the slide nip N1 is smaller than the fixing nip N2.

A description is provided of results of an experiment, that indicate a relation between the slide nip N1 and the fixing nip N2.

The experiment uses fixing devices of two types, that is, a first fixing device having a first configuration and a second fixing device having a second configuration.

The first fixing device includes the fixing belt 20 having an outer diameter of 25 mm. The fixing belt 20 includes the base layer that has a thickness of 60 μm and is made of polyimide, the elastic layer that has a thickness of 250 μm and is made of silicone rubber, and the release layer, serving as the outermost surface layer, that has a thickness of 12 μm and is made of PFA. The pressure roller 21 has an outer diameter of 20 mm. The pressure roller 21 includes the core metal 21*a*, the elastic layer 21*b* that has a thickness of 3.5 mm and is made of silicone rubber, and the surface layer 21*c*, serving as an outermost surface layer or a release layer, that has a thickness of 50 μm and is made of PFA.

The second fixing device includes the fixing belt 20 having an outer diameter of 25 mm. The fixing belt 20 includes the base layer that has a thickness of 40 μm and is made of nickel, the elastic layer that has a thickness of 120 μm and is made of silicone rubber, and the release layer, serving as the outermost surface layer, that has a thickness of 7 μm and is made of PFA. The pressure roller 21 of the second fixing device has a construction equivalent to the construction of the pressure roller 21 of the first fixing device.

Figure 10:
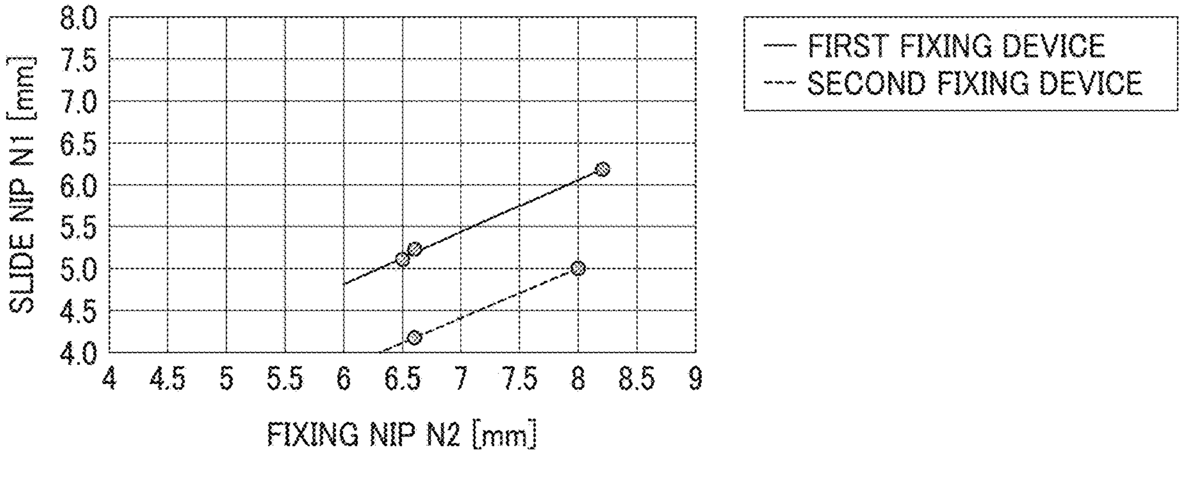
FIG. 10 is a graph illustrating a relation between a width of the slide nip and a width of the fixing nip depicted in FIG. 9.

With the first fixing device and the second fixing device, as a hardness (e.g., Asker C hardness) on an axis of the pressure roller 21 changes, a width of the slide nip N1 and a width of the fixing nip N2 in the sheet conveyance direction DP are measured to obtain results of measurement illustrated in FIG. 10. FIG. 10 illustrates a result of the first fixing device with a solid line. FIG. 10 illustrates a result of the second fixing device with a broken line.

The width of the fixing nip N2 is measured as below. While the fixing belt 20 has a surface temperature of 190 degrees Celsius, the fixing device 9A (e.g., the first fixing device or the second fixing device) is driven for five minutes or longer. After an overhead projector (OHP) transparency starts passing through the fixing nip N2 until the fixing belt 20 rotates for one rotation, the fixing device 9A stops and halts a leading edge of the OHP transparency. The fixing belt 20 and the pressure roller 21 sandwich the OHP transparency at the fixing nip N2. After the OHP transparency is left for 20 seconds, the OHP transparency is removed. An imprint of the width of the fixing nip N2, that is produced on the OHP transparency, is measured precisely with a vernier caliper. Thus, the width of the fixing nip N2 of the fixing device 9A is measured.

As illustrated in FIG. 10, with the fixing nip N2 having a width in a range of from 6.5 mm to 8.0 mm, the slide nip N1 of the first fixing device is smaller than the fixing nip N2 by a width in a range of from 1.4 mm to 2.0 mm approximately. Conversely, the slide nip N1 of the second fixing device is smaller than the fixing nip N2 by a width in a range of from 2.4 mm to 3.0 mm approximately. Thus, the second fixing device employing the fixing belt 20 incorporating the base layer made of nickel having an increased rigidity decreases the width of the slide nip N1.

If the resistive heat generators 31C are disposed outside the slide nip N1 in the sheet conveyance direction DP, the temperature of the heater 22C increases in an outside of the slide nip N1, decreasing viscosity of the grease 90 in the grease reservoirs 40 and volatilizing the fluorine oil. Hence, the second fixing device employing the fixing belt 20 having an increased rigidity increases the fixing nip N2 and the slide nip N1. For example, the second fixing device employs the fixing nip N2 spotted at an upper right position in FIG. 10. Hence, in view of downsizing the fixing device 9A and suppressing driving torque, the fixing belt 20 of the first fixing device is preferably employed.

Figure 11:
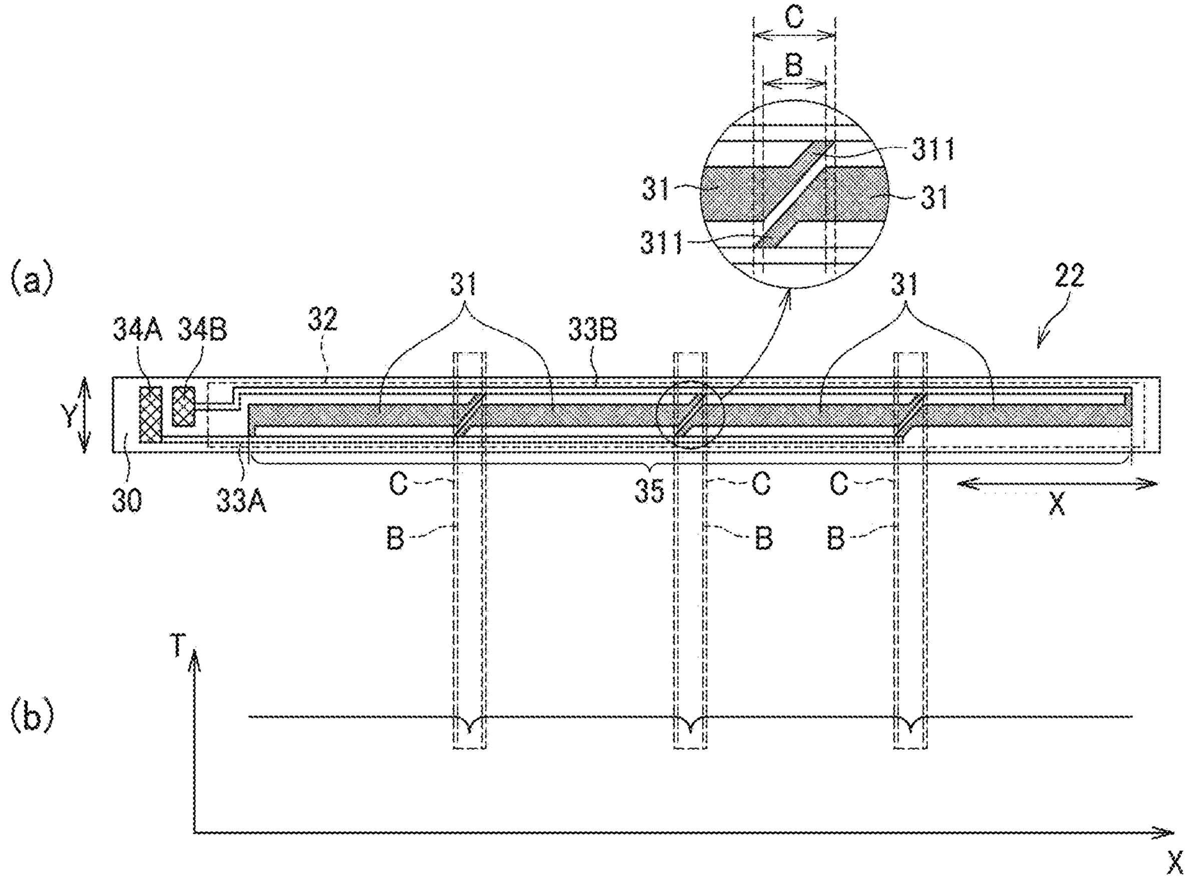
FIG. 11 is a plan view of the heater depicted in FIG. 3, illustrating a temperature profile of a fixing belt in a longitudinal direction thereof, that is incorporated in the fixing device depicted in FIG. 2.

FIG. 11 is a diagram illustrating a temperature profile of the fixing belt 20 in the longitudinal direction thereof. FIG. 11 illustrates, in a section (a), arrangement of the resistive heat generators 31 of the heater 22. FIG. 11 illustrates, in a section (b), a vertical axis that represents a temperature T of the fixing belt 20 and a horizontal axis that represents the longitudinal direction X of the fixing belt 20.

As illustrated in the sections (a) and (b) in FIG. 11, the heater 22 includes the plurality of resistive heat generators 31 divided and arranged in the longitudinal direction X of the heater 22 to produce a gap B (e.g., a dividing region) between the adjacent resistive heat generators 31 in the longitudinal direction X of the heater 22. In other words, the plurality of resistive heat generators 31 of the heater 22 is arranged with the gap B between the adjacent resistive heat generators 31. The gap B defines a dividing region or a dividing span. An opposed portion of the resistive heat generators 31, that is disposed opposite the gap B, occupies an area smaller than an area of other portion of each of the resistive heat generators 31, thus generating a decreased amount of heat. Accordingly, an opposed portion of the fixing belt 20, that is disposed opposite the gap B, has a lower temperature compared to other portion of the fixing belt 20, causing uneven temperature of the fixing belt 20 in the longitudinal direction X thereof. The adjacent resistive heat generators 31 define an enlarged gap region C (e.g., an enlarged dividing region) encompassing the gap B, serving as the dividing region, and a peripheral region thereof. The heater 22 and the fixing belt 20 suffer from temperature decrease also in opposed portions thereof, that are disposed opposite the enlarged gap region C, respectively. Similarly, the heater 22 suffers from temperature decrease also in an opposed portion thereof, that is disposed opposite the gap B. As illustrated in an enlarged view in the section (a) in FIG. 11, the gap B indicates a region encompassing an entirety of the dividing region between the adjacent resistive heat generators 31 serving as a main heat generation portion of the heater 22 in the longitudinal direction thereof. The resistive heat generator 31 includes a joint 311 that is coupled with the feeder 33A or 33B. The enlarged gap region C encompasses the joints 311 in addition to the gap B. The joint 311 defines a part of the resistive heat generator 31, that extends substantially in the short direction Y of the heater 22 and is coupled with the feeder 33A or 33B.

Figure 12:
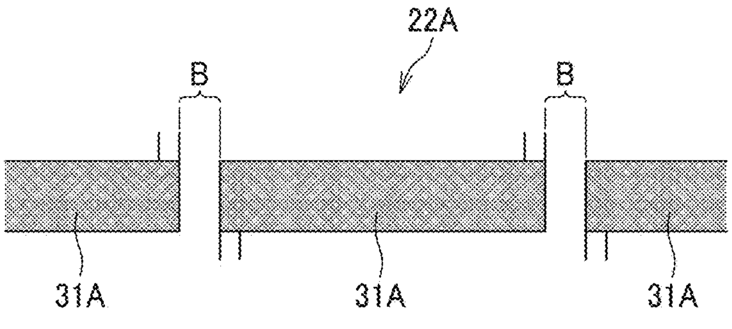
FIG. 12 is a diagram of the heater depicted in FIG. 5, illustrating a dividing region between the resistive heat generators.
Figure 13:
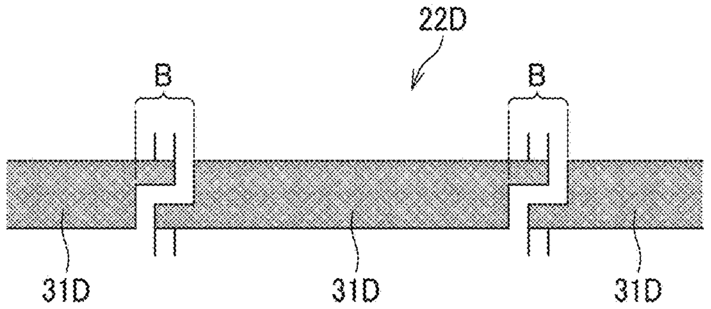
FIG. 13 is a diagram of a heater incorporating resistive heat generators that define a dividing region different from the dividing region depicted in FIG. 12.
Figure 14:
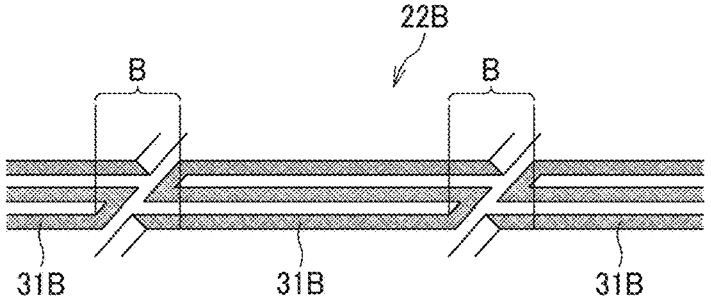
FIG. 14 is a diagram of the heater depicted in FIG. 6, illustrating a dividing region between the resistive heat generators.

FIG. 12 illustrates the heater 22A depicted in FIG. 5 that includes the resistive heat generators 31A that are rectangular. In the heater 22A also, a temperature of an opposed portion of the heater 22A, that is disposed opposite the gap B, is lower than a temperature of other portion of the heater 22A. FIG. 13 illustrates a heater 22D that includes a plurality of resistive heat generators 31D that is zigzag. In the heater 22D also, a temperature of an opposed portion of the heater 22D, that is disposed opposite the gap B, is lower than a temperature of other portion of the heater 22D. FIG. 14 illustrates the heater 22B depicted in FIG. 6 that includes the resistive heat generators 31B including the linear portion that defines the parallelogram. In the heater 22B also, a temperature of an opposed portion of the heater 22B, that is disposed opposite the gap B, is lower than a temperature of other portion of the heater 22B. As illustrated in FIGS. 11, 13, and 14, the adjacent resistive heat generators 31, 31D, and 31B overlap each other in a longitudinal direction of the heaters 22, 22D, and 22B, suppressing temperature decrease of the opposed portion of each of the heaters 22, 22D, and 22B, that is disposed opposite the gap B, compared to other portion of each of the heaters 22, 22D, and 22B.

The fixing device 9 according to the embodiment incorporates the first thermal conductor 28 that suppresses temperature decrease at the gap B and thereby suppresses uneven temperature of the fixing belt 20 in the longitudinal direction thereof.

A description is provided of a configuration of the first thermal conductor 28 in detail.

As illustrated in FIG. 2, the first thermal conductor 28 is interposed between the heater 22 and the stay 24 in a horizontal direction in FIG. 2. Specifically, the first thermal conductor 28 is sandwiched between the heater 22 and the heater holder 23. For example, the first thermal conductor 28 has one face that is disposed opposite the back face 30*b* of the base 30 of the heater 22 and another face that contacts the heater holder 23.

The stay 24 includes two perpendicular portions 24*a* that extend in a thickness direction of the heater 22 and the like. Each of the perpendicular portions 24*a* has a contact face 24*a*1 that contacts the heater holder 23, supporting the heater holder 23, the first thermal conductor 28, and the heater 22. The contact faces 24*a*1 are disposed outboard from the resistive heat generators 31 in the short direction Y (e.g., a vertical direction in FIG. 2) of the heater 22. Thus, the stay 24 suppresses conduction of heat thereto from the heater 22, causing the heater 22 to heat the fixing belt 20 efficiently.

Figure 15:
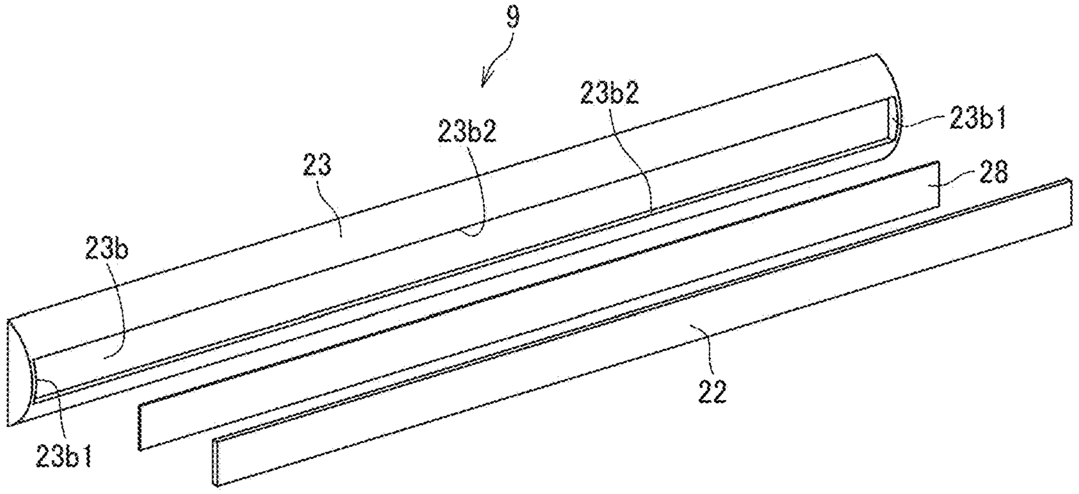
FIG. 15 is a perspective view of the heater, the first thermal conductor, and a heater holder incorporated in the fixing device depicted in FIG. 2.

As illustrated in FIG. 15, the first thermal conductor 28 is a plate. According to the embodiment, the first thermal conductor 28 is constructed of a single plate. Alternatively, the first thermal conductor 28 may be constructed of a plurality of members. FIG. 15 omits illustration of the guides 26 depicted in FIG. 2.

The first thermal conductor 28 is fitted to the recess 23*b* of the heater holder 23. The heater 22 is attached to the heater holder 23 from above the first thermal conductor 28. Thus, the heater holder 23 and the heater 22 sandwich and hold the first thermal conductor 28. According to the embodiment, the first thermal conductor 28 has a length in the longitudinal direction thereof, which is equivalent to a length of the heater 22 in the longitudinal direction thereof. The heater holder 23 includes side walls 23*b*1, serving as longitudinal direction restrictors, that are disposed at both lateral ends of the heater holder 23 in the longitudinal direction thereof, respectively, and define the recess 23*b*. The side walls 23*b*1 restrict motion of the first thermal conductor 28 and the heater 22 in the longitudinal direction thereof. Thus, the side walls 23*b*1 restrict shifting of the first thermal conductor 28 in the longitudinal direction thereof inside the fixing device 9, improving efficiency in thermal conduction in a target span in the longitudinal direction of the first thermal conductor 28. The heater holder 23 further includes side walls 23*b*2, serving as short direction restrictors, that are disposed at both ends of the heater holder 23 in a short direction thereof, respectively, and define the recess 23*b*. The side walls 23*b*2 restrict motion of the first thermal conductor 28 and the heater 22 in the short direction thereof.

Figure 16:
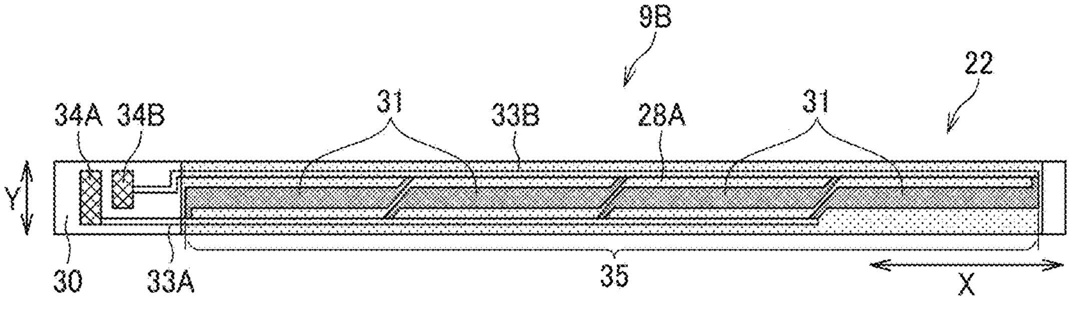
FIG. 16 is a plan view of the heater depicted in FIG. 15, illustrating an arrangement of a first thermal conductor as a variation of the first thermal conductor depicted in FIG. 15.
Figure 17:
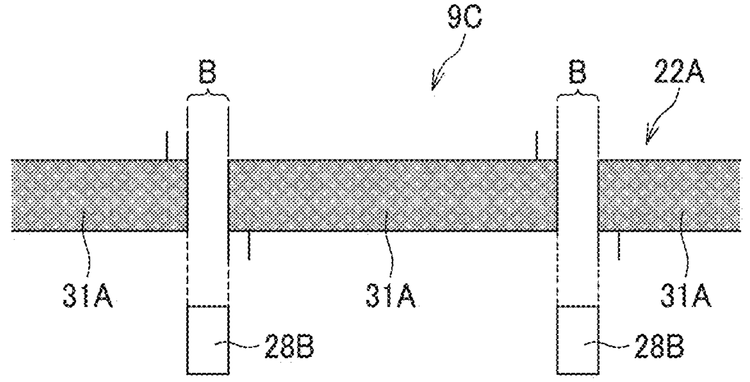
FIG. 17 is a plan view of the heater depicted in FIG. 12, illustrating a first thermal conductor as another variation of the first thermal conductor depicted in FIG. 15.
Figure 18:
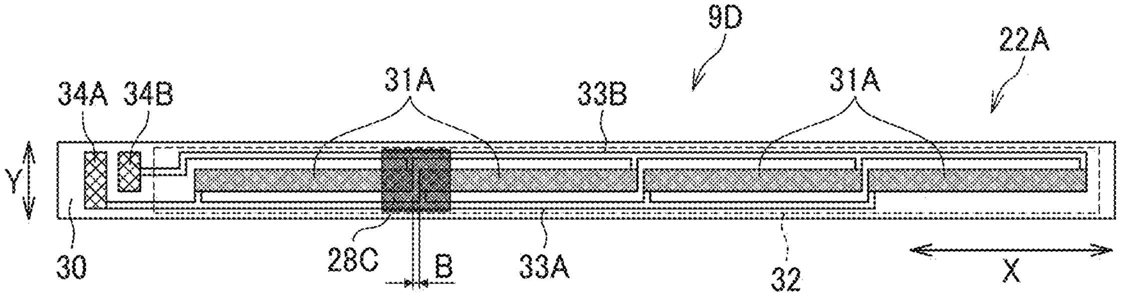
FIG. 18 is a plan view of the heater depicted in FIG. 17, illustrating a first thermal conductor as yet another variation of the first thermal conductor depicted in FIG. 15.

The first thermal conductor 28 may extend in a span other than a span in which the first thermal conductor 28 extends in the longitudinal direction thereof as illustrated in FIG. 15. For example, FIG. 16 illustrates a fixing device 9B incorporating a first thermal conductor 28A that extends in a span hatched in FIG. 16 and defined by the heat generation portion 35 in the longitudinal direction X of the heater 22. FIG. 17 illustrates a fixing device 9C incorporating first thermal conductors 28B. Each of the first thermal conductors 28B is disposed opposite and spans an entire span of the gap B in a longitudinal direction of the heater 22A in which the resistive heat generators 31A are arranged. FIG. 17 illustrates the resistive heat generators 31A shifted from the first thermal conductors 28B vertically in FIG. 17 for convenience. Practically, the resistive heat generators 31A are substantially leveled with the first thermal conductors 28B in a short direction of the heater 22A. Alternatively, the first thermal conductors 28B may be disposed with respect to the resistive heat generators 31A with other arrangement. For example, the first thermal conductor 28B may span or cover a part of the resistive heat generator 31A in the short direction of the heater 22A. FIG. 18 illustrates a fixing device 9D incorporating a first thermal conductor 28C that spans or covers an entirety of the resistive heat generator 31A in the short direction Y of the heater 22A. As illustrated in FIG. 18, the first thermal conductor 28C is disposed opposite and spans the gap B in the longitudinal direction X of the heater 22A. Additionally, the first thermal conductor 28C bridges the adjacent resistive heat generators 31A that sandwich the gap B. A state in which the first thermal conductor 28C bridges the adjacent resistive heat generators 31A denotes a state in which the first thermal conductor 28C overlaps the adjacent resistive heat generators 31A at least partially in the longitudinal direction X of the heater 22A. Alternatively, the first thermal conductors 28C may be disposed opposite the gaps B of the heater 22A, respectively. Yet alternatively, for example, as illustrated in FIG. 18, the first thermal conductor 28C may be disposed opposite a part of the gaps B, for example, one of the gaps B. A state in which the first thermal conductor 28C spans the gap B in the longitudinal direction X of the heater 22A denotes that at least a part of the first thermal conductor 28C overlaps the gap B in the longitudinal direction X of the heater 22A.

As illustrated in FIGS. 2 and 9, as the pressure roller 21 applies pressure to a heater (e.g., the heaters 22, 22A, 22B, 22C, and 22D), the heater and the heater holder 23 sandwich a first thermal conductor (e.g., the first thermal conductors 28, 28A, 28B, and 28C) such that the first thermal conductor contacts the heater and the heater holder 23. As the first thermal conductor contacts the heater, the first thermal conductor conducts heat generated by the heater in a longitudinal direction thereof with improved efficiency. The first thermal conductor is disposed opposite at least one gap B between adjacent resistive heat generators (e.g., the resistive heat generators 31, 31A, 31B, 31C, and 31D) arranged in a longitudinal direction of the heater. Thus, the first thermal conductor improves efficiency in conduction of heat at the gaps B, increases an amount of heat conducted to the gaps B, and increases the temperature of the heater at the gaps B arranged in the longitudinal direction of the heater, thus suppressing uneven temperature of the heater in the longitudinal direction thereof. Accordingly, the first thermal conductor suppresses uneven temperature of the fixing belt 20 in the longitudinal direction thereof. Consequently, the fixing belt 20 suppresses uneven fixing and uneven gloss of a toner image fixed on a sheet P. The heater does not heat the fixing belt 20 redundantly to attain sufficient fixing performance at the gaps B, causing a fixing device (e.g., the fixing devices 9, 9A, 9B, 9C, and 9D) to save energy. The first thermal conductor extends throughout an entire span of the heat generating portion 35 in the longitudinal direction of the heater. Accordingly, the first thermal conductor improves efficiency in conduction of heat of the heater in an entirety of a main heating span of the heater disposed opposite an imaging span of a toner image formed on a sheet P conveyed through the fixing nip N2. Accordingly, the first thermal conductor suppresses uneven temperature of the heater and the fixing belt 20 in the longitudinal direction thereof.

According to the embodiment, the first thermal conductor is coupled with the resistive heat generators having the PTC property described above, suppressing overheating of the fixing belt 20 in the non-conveyance span where a sheet P having a decreased size is not conveyed effectively. For example, the PTC property suppresses an amount of heat generated by the resistive heat generators in the non-conveyance span. Additionally, the first thermal conductor efficiently conducts heat from the non-conveyance span on the fixing belt 20 that suffers from temperature increase to a sheet conveyance span on the fixing belt 20, where the sheet P is conveyed, thus suppressing overheating of the fixing belt 20 in the non-conveyance span effectively.

Since the heater generates heat in a decreased amount at the gap B between the adjacent resistive heat generators, the heater has a decreased temperature also in a periphery of the gap B. To address the circumstance, the first thermal conductor is preferably disposed also in the periphery of the gap B. For example, according to the embodiment illustrated in FIG. 11, the first thermal conductor 28 is disposed opposite the enlarged gap region C. Hence, the first thermal conductor 28 improves efficiency in conduction of heat at the gap B and the periphery thereof in the longitudinal direction X of the heater 22, suppressing uneven temperature of the heater 22 in the longitudinal direction X thereof. According to the embodiment, the first thermal conductor 28 extends throughout the entire span of the heat generation portion 35 in the longitudinal direction X of the heater 22. Accordingly, the first thermal conductor 28 suppresses uneven temperature of the heater 22 and the fixing belt 20 in the longitudinal direction X thereof more effectively.

A description is provided of a construction of a fixing device 9E according to an embodiment of the present disclosure.

Figure 19:
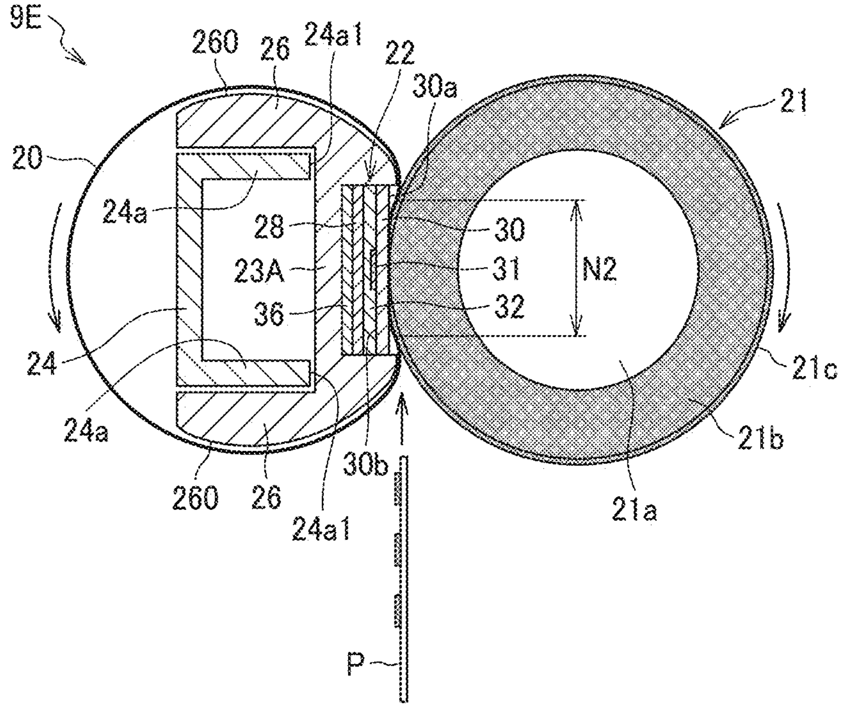
FIG. 19 is a schematic side cross-sectional view of a fixing device according to yet another embodiment of the present disclosure, that is installable in the image forming apparatus depicted in FIG. 1.

As illustrated in FIG. 19, the fixing device 9E according to the embodiment includes second thermal conductors 36 and a heater holder 23A. The second thermal conductors 36 are sandwiched between the heater holder 23A and the first thermal conductor 28. Each of the second thermal conductors 36 is disposed at a position different from a position of the first thermal conductor 28 in a laminating direction (e.g., a horizontal direction in FIG. 19) in which the stay 24, the heater holder 23A, the second thermal conductor 36, the first thermal conductor 28, and the heater 22 are arranged. Specifically, the second thermal conductors 36 are superimposed on the first thermal conductor 28. Unlike FIG. 2 illustrating the fixing device 9, FIG. 19 illustrates a cross section, that crosses a longitudinal direction of the fixing device 9E in which the second thermal conductors 36 are arranged, where the second thermal conductor 36 is disposed and the thermistor 25 is not disposed in the laminating direction.

The second thermal conductor 36 is made of a material having a thermal conductivity greater than a thermal conductivity of the base 30. For example, the second thermal conductor 36 is made of graphene or graphite. According to the embodiment, the second thermal conductor 36 is a graphite sheet having a thickness of 1 mm. Alternatively, the second thermal conductor 36 may be a plate made of aluminum, copper, silver, or the like.

Figure 20:
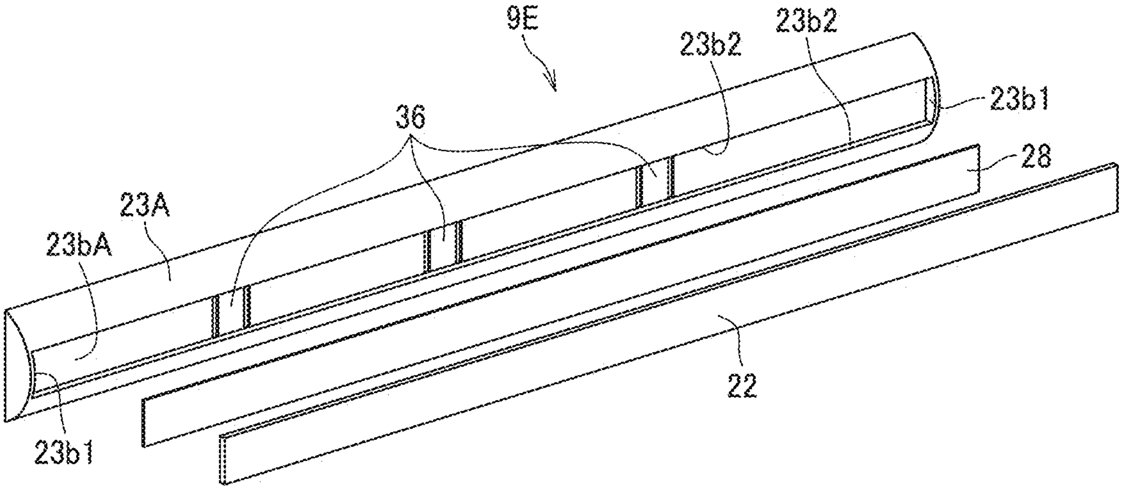
FIG. 20 is a perspective view of the heater, the first thermal conductor, second thermal conductors, and a heater holder incorporated in the fixing device depicted in FIG. 19.

As illustrated in FIG. 20, the plurality of second thermal conductors 36 is arranged on a plurality of parts on the heater holder 23A in a longitudinal direction thereof, respectively. The heater holder 23A includes a recess 23bA that includes cavities placed with the second thermal conductors 36, respectively. The cavities are stepped down by one step from other portion of the recess 23bA. The second thermal conductor 36 and the heater holder 23A define a gap therebetween at both lateral ends of the second thermal conductor 36 in the longitudinal direction of the heater holder 23A. Thus, the second thermal conductor 36 suppresses conduction of heat therefrom to the heater holder 23A, causing the heater 22 to heat the fixing belt 20 efficiently. FIG. 20 omits illustration of the guides 26 depicted in FIG. 2.

Figure 21:
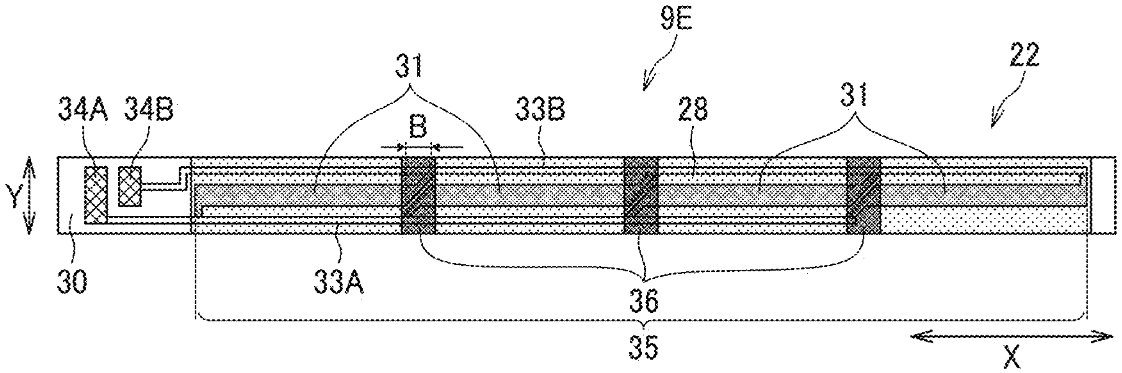
FIG. 21 is a plan view of the heater depicted in FIG. 20, illustrating an arrangement of the first thermal conductor and the second thermal conductors.
Figure 25:
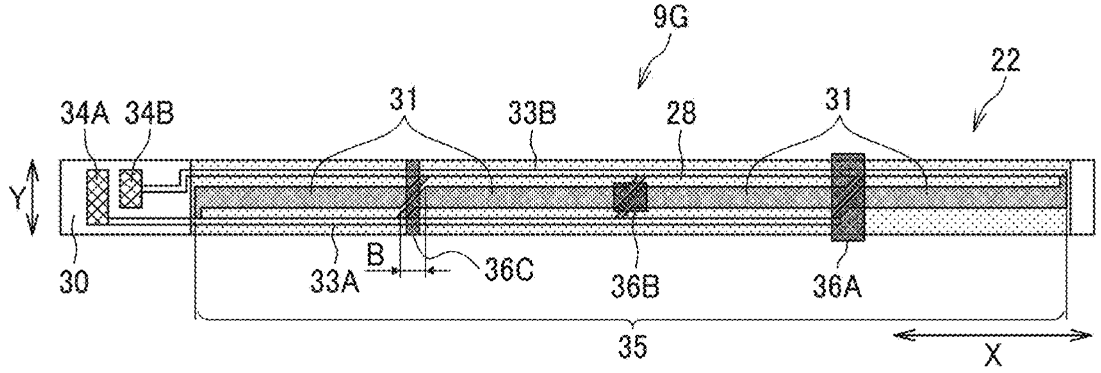
FIG. 25 is a plan view of the heater depicted in FIG. 21, illustrating an arrangement of second thermal conductors as a variation of the second thermal conductors depicted in FIG. 21.

As illustrated in FIG. 21, the second thermal conductor 36 that is hatched is disposed opposite the gap B between the adjacent resistive heat generators 31 and overlaps at least a part of the adjacent resistive heat generators 31 in the longitudinal direction X of the heater 22. According to the embodiment, the second thermal conductor 36 extends throughout the entire span of the gap B. FIG. 21 and FIG. 25 referred to in a description below illustrate the first thermal conductor 28 that is disposed opposite and spans the heat generation portion 35 in the longitudinal direction X of the heater 22. Alternatively, the first thermal conductor 28 may span differently as described above.

The fixing device 9E according to the embodiment includes, in addition to the first thermal conductor 28, the second thermal conductors 36 each of which is disposed opposite the gap B and overlaps at least a part of the adjacent resistive heat generators 31 in the longitudinal direction X of the heater 22. The second thermal conductors 36 improve efficiency in conduction of heat at the gaps B in the longitudinal direction X of the heater 22, suppressing uneven temperature of the heater 22 in the longitudinal direction X thereof more effectively.

Figure 22:
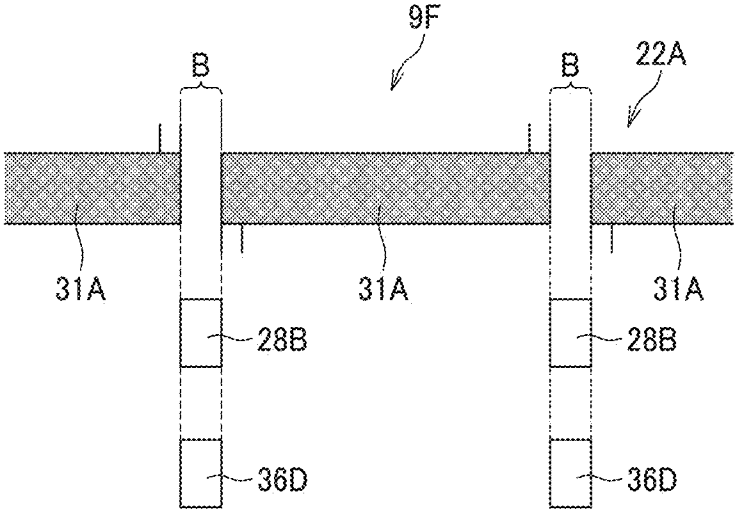
FIG. 22 is a plan view of the heater depicted in FIG. 17, illustrating the first thermal conductor depicted in FIG. 17 and a second thermal conductor that are arranged with an arrangement different from the arrangement depicted in FIG. 21.

FIG. 22 illustrates a fixing device 9F including the first thermal conductors 28B, second thermal conductors 36D, and a heater 22A including the resistive heat generators 31A. The first thermal conductor 28B and the second thermal conductor 36D are preferably disposed opposite the entire span of the gap B in the longitudinal direction of the heater 22A. Accordingly, the first thermal conductor 28B and the second thermal conductor 36D improve efficiency in conduction of heat at the gap B compared to an outboard region of the heater 22A, which is other than the gap B. FIG. 22 illustrates the resistive heat generators 31A shifted from the first thermal conductors 28B and the second thermal conductors 36D vertically in FIG. 22 for convenience. Practically, the resistive heat generators 31A are substantially leveled with the first thermal conductors 28B in the short direction of the heater 22A. Alternatively, the first thermal conductors 28B may be disposed with respect to the resistive heat generators 31A with other arrangement. For example, the first thermal conductor 28B and the second thermal conductor 36D may span a part of the resistive heat generator 31A in the short direction of the heater 22A. The first thermal conductor 28B and the second thermal conductor 36D may span or cover the entirety of the resistive heat generator 31A in the short direction of the heater 22A.

Unlike the embodiment described above, according to an embodiment of the present disclosure, each of a first thermal conductor (e.g., the first thermal conductors 28, 28A, 28B, and 28C) and a second thermal conductor (e.g., the second thermal conductors 36 and 36D) is made of a graphene sheet. Hence, each of the first thermal conductor and the second thermal conductor has an enhanced thermal conductivity in a predetermined direction along a surface of the graphene sheet, that is, a longitudinal direction of a heater (e.g., the heaters 22, 22A, 22B, 22C, and 22D), not a thickness direction of the first thermal conductor and the second thermal conductor. Accordingly, the first thermal conductor and the second thermal conductor suppress uneven temperature of the heater and the fixing belt 20 in the longitudinal direction thereof effectively.

Figure 23:
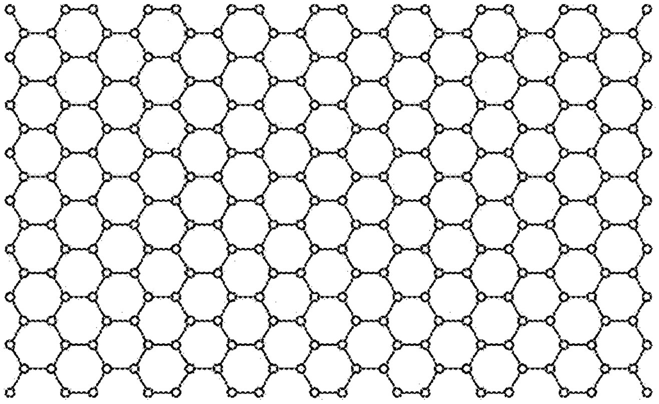
FIG. 23 is a diagram of a crystalline structure of atoms of graphene.

Graphene is thin powder. As illustrated in FIG. 23, graphene is constructed of a plane of carbon atoms arranged in a two-dimensional honeycomb lattice. The graphene sheet is graphene in a sheet form and is usually constructed of a single layer. The graphene sheet may contain impurities in the single layer of carbon atoms. The graphene sheet may have a fullerene structure. The fullerene structure is generally recognized as a polycyclic compound constructed of an identical number of carbon atoms bonded to form a cage with fused rings of five and six atoms. For example, the fullerene structure is a closed cage structure formed of fullerene $C_{60}$, $C_{70}$, and $C_{80}$, 3-coordinated carbon atoms, or the like.

The graphene sheet is artificial and is produced by chemical vapor deposition (CVD), for example.

The graphene sheet is commercially available. A size and a thickness of the graphene sheet and a number of layers and the like of the graphite sheet described below are measured with a transmission electron microscope (TEM), for example.

Figure 24:
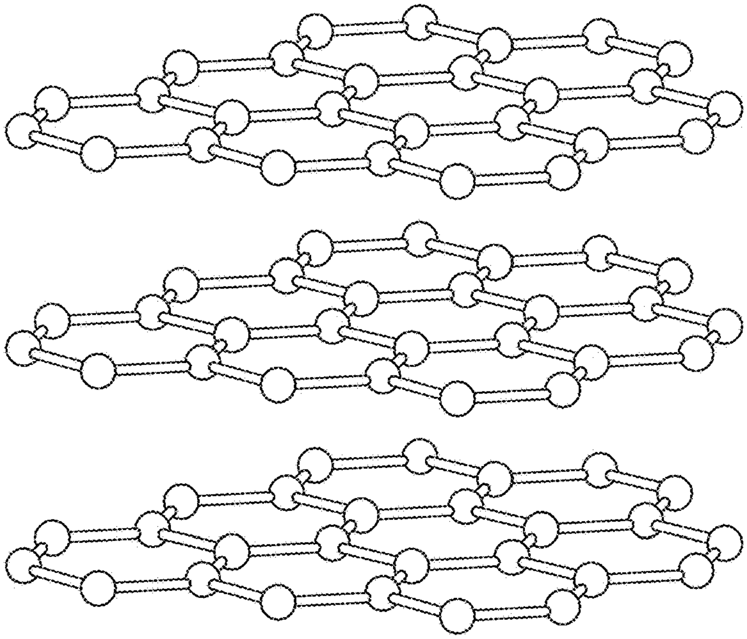
FIG. 24 is a diagram of a crystalline structure of atoms of graphite.

Graphite is constructed of stacked layers of graphene and is highly anisotropic in thermal conduction. As illustrated in FIG. 24, graphite has a plurality of layers, each of which is constructed of hexagonal fused rings of carbon atoms, that are bonded planarly. The plurality of layers defines a crystalline structure. In the crystalline structure, adjacent carbon atoms in the layer are bonded with each other by a covalent bond. Bonding between layers of carbon atoms is established by the van der Waals bond. The covalent bond achieves bonding greater than bonding by the van der Waals bond. Graphite is highly anisotropic with bonding within the layer and bonding between the layers. For example, a first thermal conductor (e.g., the first thermal conductors 28, 28A, 28B, and 28C) or a second thermal conductor (e.g., the second thermal conductors 36 and 36D) is made of graphite. Accordingly, the first thermal conductor or the second thermal conductor attains an efficiency in conduction of heat in the longitudinal direction of a heater (e.g., the heaters 22, 22A, 22B, 22C, and 22D), which is greater than an efficiency in conduction of heat in a thickness direction, that is, the laminating direction (e.g., the horizontal direction in FIG. 19) in which the stay 24, the heater holder 23A, the second thermal conductor 36, the first thermal conductor 28, and the heater 22 are arranged, thus suppressing conduction of heat to the heater holder 23A. Consequently, the first thermal conductor or the second thermal conductor suppresses uneven temperature of the heater in the longitudinal direction X thereof efficiently. Additionally, the first thermal conductor or the second thermal conductor minimizes heat conducted to the heater holder 23A. The first thermal conductor or the second thermal conductor that is made of graphite attains enhanced heat resistance that inhibits oxidation at approximately 700 degrees Celsius.

The graphite sheet has a physical property and a dimension that are adjusted properly according to a function of the first thermal conductor or the second thermal conductor. For example, the graphite sheet is made of graphite having enhanced purity or single crystal graphite. The graphite sheet has an increased thickness to enhance anisotropic thermal conduction. In order to perform high speed fixing, a fixing device (e.g., the fixing devices 9E and 9F) employs the graphite sheet having a decreased thickness to decrease thermal capacity of the fixing device. If the fixing nip N2 and the heater have an increased length in the longitudinal direction X thereof, the first thermal conductor or the second thermal conductor also has an increased length in the longitudinal direction X of the heater.

In view of increasing mechanical strength, the graphite sheet preferably has a number of layers that is not smaller than 11 layers. The graphite sheet may include a part constructed of a single layer and another part constructed of a plurality of layers.

The second thermal conductor 36 is disposed opposite the gap B between the adjacent resistive heat generators 31 and the enlarged gap region C depicted in FIG. 11 and overlaps at least a part of the adjacent resistive heat generators 31 in the longitudinal direction X of the heater 22. Hence, the second thermal conductor 36 may be positioned with respect to the resistive heat generators 31 differently from the second thermal conductor 36 depicted in FIG. 21. For example, FIG. 25 illustrates a fixing device 9G including a second thermal conductor 36A that protrudes beyond the base 30 bidirectionally in the short direction Y of the heater 22. The fixing device 9G further includes a second thermal conductor 36B that is disposed in a span of the resistive heat generator 31 in the short direction Y of the heater 22. The fixing device 9G further includes a second thermal conductor 36C that spans a part of the gap B.

Figure 26:
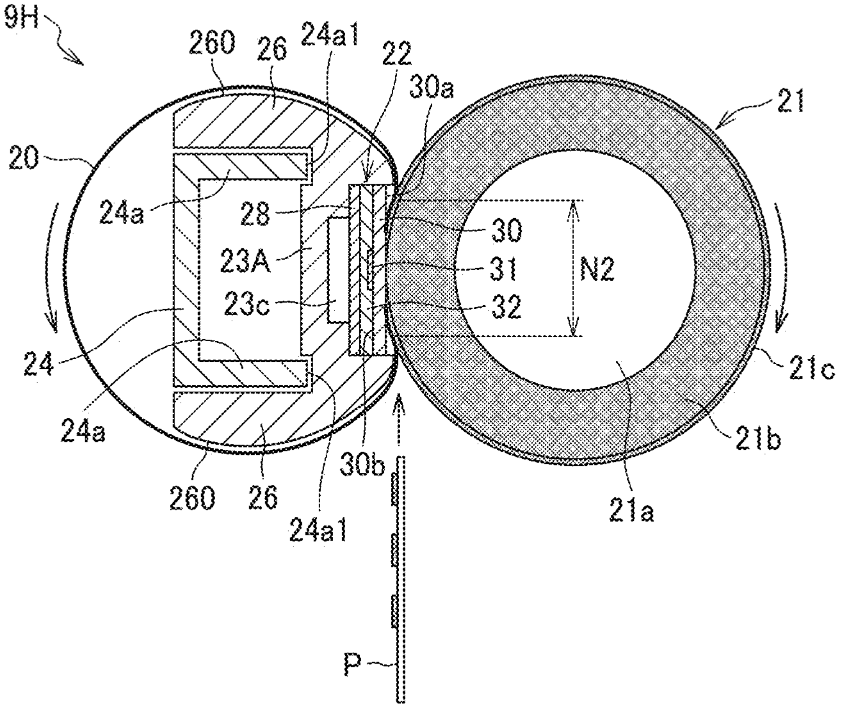
FIG. 26 is a schematic side cross-sectional view of a fixing device according to yet another embodiment of the present disclosure, that is installable in the image forming apparatus depicted in FIG. 1.

FIG. 26 illustrates a fixing device 9H according to an embodiment of the present disclosure that includes the heater holder 23A including a retracted portion 23*c* (e.g., a clearance) that is interposed between the first thermal conductor 28 and a body of the heater holder 23A in a thickness direction of the heater holder 23A (e.g., a horizontal direction in FIG. 26). For example, the retracted portion 23*c* is disposed in a part of the recess 23bA of the heater holder 23A depicted in FIG. 20, which accommodates the heater 22, the first thermal conductor 28, and the second thermal conductors 36. The retracted portion 23*c* is disposed outboard from the second thermal conductor 36 in the longitudinal direction X of the heater 22. The retracted portion 23*c* spans a part of the recess 23bA in the short direction Y of the heater 22. Apart of the recess 23bA is stepped down from other part of the recess 23bA, that accommodates the first thermal conductor 28, to produce the retracted portion 23*c* serving as a thermal insulation layer. Accordingly, the heater holder 23A contacts the first thermal conductor 28 with a decreased contact area, thus suppressing conduction of heat from the first thermal conductor 28 to the heater holder 23A and causing the heater 22 to heat the fixing belt 20 efficiently. On a cross section that intersects a longitudinal direction of the fixing device 9H and is provided with the second thermal conductor 36, the second thermal conductor 36 contacts the heater holder 23A as illustrated in FIG. 19 illustrating the fixing device 9E according to the embodiment described above.

According to the embodiment, the retracted portion 23*c* spans an entirety of the resistive heat generator 31 in the short direction Y (e.g., a vertical direction in FIG. 26) of the heater 22. Thus, the retracted portion 23*c* suppresses conduction of heat from the first thermal conductor 28 to the heater holder 23A, causing the heater 22 to heat the fixing belt 20 efficiently. Alternatively, instead of the retracted portion 23*c* that defines the clearance, the fixing device 9H may incorporate a thermal insulator that has a thermal conductivity smaller than a thermal conductivity of the heater holder 23A, as the thermal insulation layer.

According to the embodiments described above, the second thermal conductor 36 is provided separately from the first thermal conductor 28. Alternatively, the fixing device 9H may have other configuration. For example, the first thermal conductor 28 may include an opposed portion that is disposed opposite the gap B and has a thickness greater than a thickness of an outboard portion of the first thermal conductor 28, which is other than the opposed portion.

According to the embodiments depicted in FIGS. 19 and 26 also, like in the embodiments described above, the resistive heat generators 31 are mounted on the back face 30*b* of the base 30, that is opposite to the front face 30*a* of the base 30, that is disposed opposite the slide nip N1. Additionally, the lubricant is applied in a proper amount. Thus, the fixing belt 20 slides over the heater 22 properly.

Figure 27:
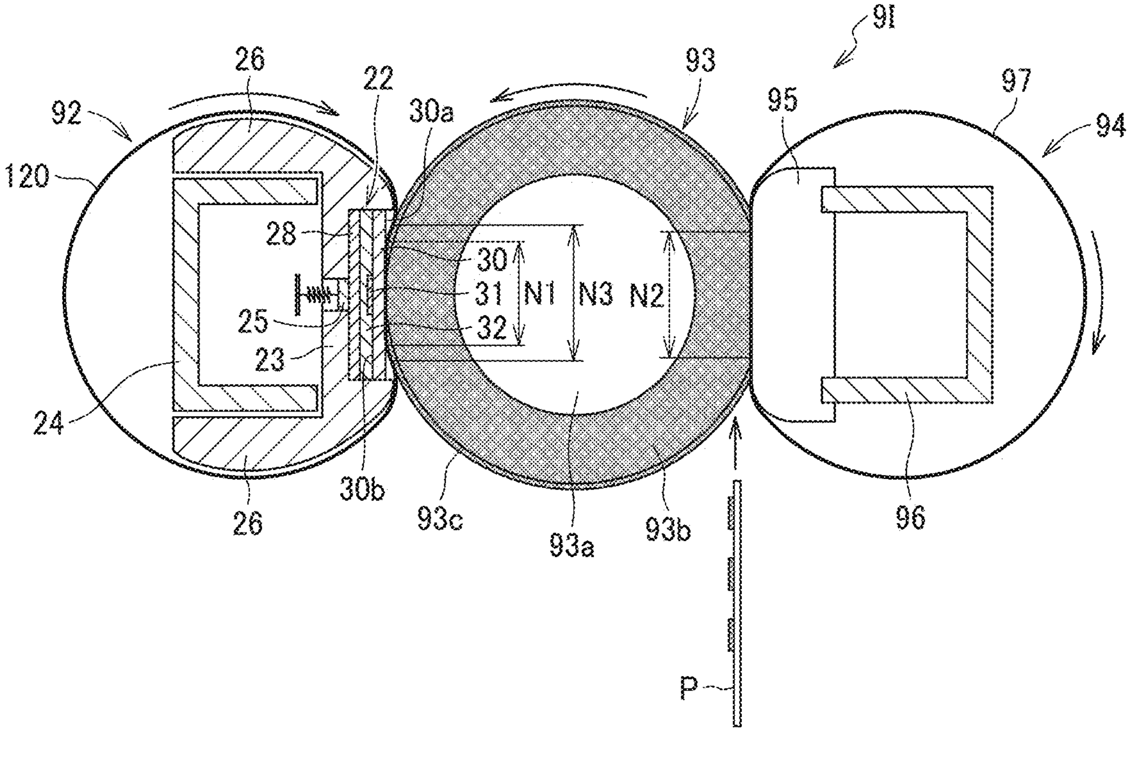
FIG. 27 is a schematic side cross-sectional view of a fixing device according to yet another embodiment of the present disclosure, that is installable in the image forming apparatus depicted in FIG. 1.

The embodiments of the present disclosure are also applied to a fixing device 9I illustrated in FIG. 27, other than the fixing devices 9, 9A, 9B, 9C, 9D, 9E, 9F, 9G, and 9H described above.

Referring to FIG. 27, a description is provided of a construction of the fixing device 9I according to an embodiment of the present disclosure.

As illustrated in FIG. 27, the fixing device 9I includes a heating assembly 92, a fixing roller 93 serving as a pressure rotator, and a pressure assembly 94 serving as an opposed rotator. The heating assembly 92 includes the heater 22, the first thermal conductor 28, the heater holder 23, and the stay 24 that are described in the embodiments above and a heating belt 120 serving as a rotator. The fixing roller 93 presses against the heating belt 120 to form a heating nip N3 therebetween, thus serving as the pressure rotator. The fixing roller 93 includes a core metal 93*a*, an elastic layer 93*b*, and a surface layer 93*c*. The pressure assembly 94 is disposed opposite the heating assembly 92 via the fixing roller 93. The pressure assembly 94 includes a nip formation pad 95, a stay 96, and a pressure belt 97. The pressure belt 97 rotates and is formed into a loop within which the nip formation pad 95 and the stay 96 are disposed. The pressure belt 97 and the fixing roller 93 define the fixing nip N2 therebetween. As a sheet P is conveyed through the fixing nip N2, the fixing roller 93 heated at the heating nip N3 and the pressure belt 97 fix a toner image formed on the sheet P thereon under heat and pressure.

According to the embodiment depicted in FIG. 27 also, like in the embodiments described above, the resistive heat generators 31 are mounted on the back face 30*b* of the base 30, that is opposite to the front face 30*a* of the base 30, that is disposed opposite the slide nip N1. Additionally, the lubricant is applied in a proper amount. Thus, the heating belt 120 slides over the heater 22 properly.

Application of the technology of the present disclosure is not limited to the fixing devices 9, 9A, 9B, 9C, 9D, 9E, 9F, 9G, 9H, and 9I according to the embodiments described above. The technology of the present disclosure is also applied to a heating device such as a dryer that dries ink applied onto a sheet. Further, the technology of the present disclosure is also applied to a heating device such as a thermocompression bonding device including a laminator and a heat sealer. The laminator bonds film as a coating member onto a surface of a sheet by thermocompression. The heat sealer bonds sealing portions of a packaging material by thermocompression. As the embodiments of the present disclosure are also applied to the heating device incorporating a rotator and a heater, the rotator slides over the heater properly.

Application of the technology of the present disclosure is not limited to the color image forming apparatus 100 depicted in FIG. 1 that forms a color toner image. The technology of the present disclosure is also applied to a monochrome image forming apparatus that forms a monochrome toner image, a copier, a printer, a facsimile machine, a multifunction peripheral (MFP) having at least two of copying, printing, facsimile, scanning, and plotter functions, or the like.

Figure 28:
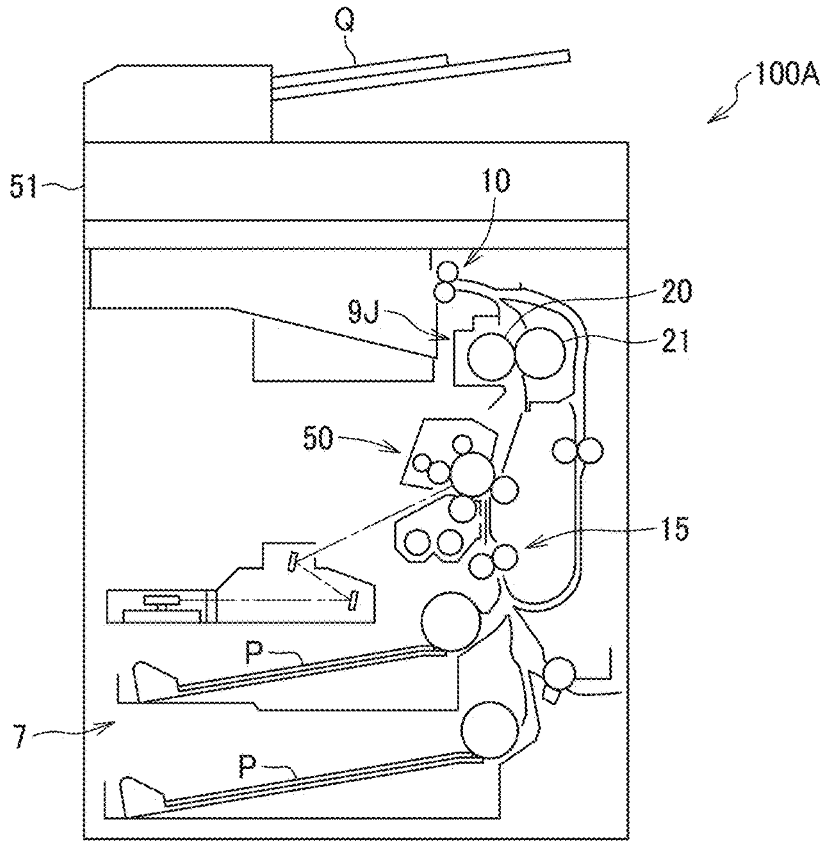
FIG. 28 is a schematic cross-sectional view of an image forming apparatus according to another embodiment of the present disclosure, that is different from the image forming apparatus depicted in FIG. 1.

For example, as illustrated in FIG. 28, an image forming apparatus 100A according to an embodiment of the present disclosure includes an image forming device 50 including a photoconductive drum, a sheet conveyance device including the timing roller pair 15, the sheet feeder 7, a fixing device 9J, the output device 10, and a scanner 51. The sheet feeder 7 includes a plurality of sheet trays (e.g., paper trays) that loads a plurality of sheets P having different sizes, respectively.

The scanner 51 reads an image on an original Q into image data. The sheet feeder 7 loads the plurality of sheets P and feeds the sheets P to a sheet conveyance path one by one. The timing roller pair 15 conveys the sheet P conveyed through the sheet conveyance path to the image forming device 50.

The image forming device 50 forms a toner image on the sheet P. For example, the image forming device 50 includes the photoconductive drum, a charging roller, an exposure device, a developing device, a replenishing device, a transfer roller, a cleaner, and a discharger. The toner image is a reproduction of the image on the original Q, for example. The fixing device 9J fixes the toner image on the sheet P under heat and pressure. The sheet P bearing the fixed toner image is conveyed to the output device 10 by a conveyance roller and the like. The output device 10 ejects the sheet P onto an outside of the image forming apparatus 100A.

A description is provided of a construction of the fixing device 9J according to an embodiment of the present disclosure.

A description of elements of the fixing device 9J, which are common to the fixing device 9 depicted in FIG. 2, is omitted properly.

Figure 29:
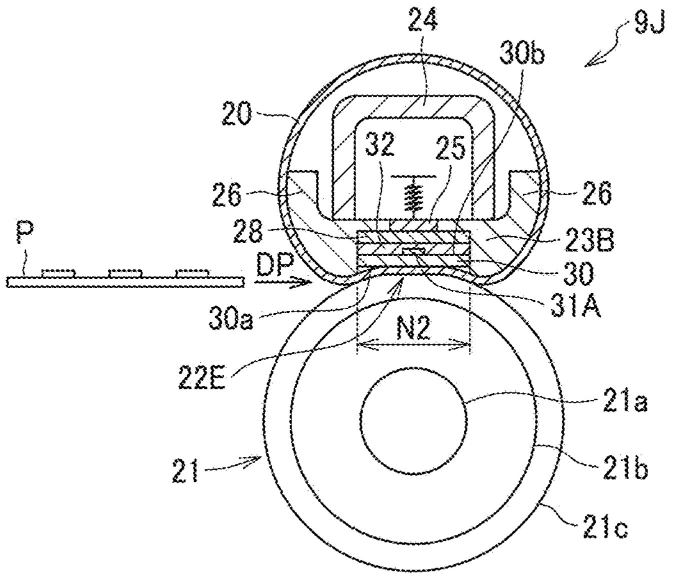
FIG. 29 is a schematic side cross-sectional view of a fixing device according to yet another embodiment of the present disclosure, that is incorporated in the image forming apparatus depicted in FIG. 28.

As illustrated in FIG. 29, the fixing device 9J includes the fixing belt 20, the pressure roller 21, a heater 22E, a heater holder 23B, the stay 24, the thermistors 25, the guides 26, and the first thermal conductor 28.

The fixing belt 20 and the pressure roller 21 define the fixing nip N2 therebetween. The fixing nip N2 has a nip width of 10 mm in the sheet conveyance direction DP. The fixing belt 20 and the pressure roller 21 convey the sheet P at a linear velocity of 240 mm/s.

The fixing belt 20 includes the base layer made of polyimide and the release layer and does not include an elastic layer. The release layer is heat-resistant film made of fluororesin, for example. The fixing belt 20 has an outer diameter of approximately 24 mm.

The pressure roller 21 includes the core metal 21*a*, the elastic layer 21*b*, and the surface layer 21*c*. The pressure roller 21 has an outer diameter in a range of from 24 mm to 30 mm. The elastic layer 21*b* has a thickness in a range of from 3 mm to 4 mm.

The heater 22E includes the base 30, a thermal insulation layer, a conductor layer including the resistive heat generators 31A, and an insulating layer. The heater 22E has a total thickness of 1 mm. The heater 22E has a width of 13 mm in the short direction Y thereof.

Figure 30:
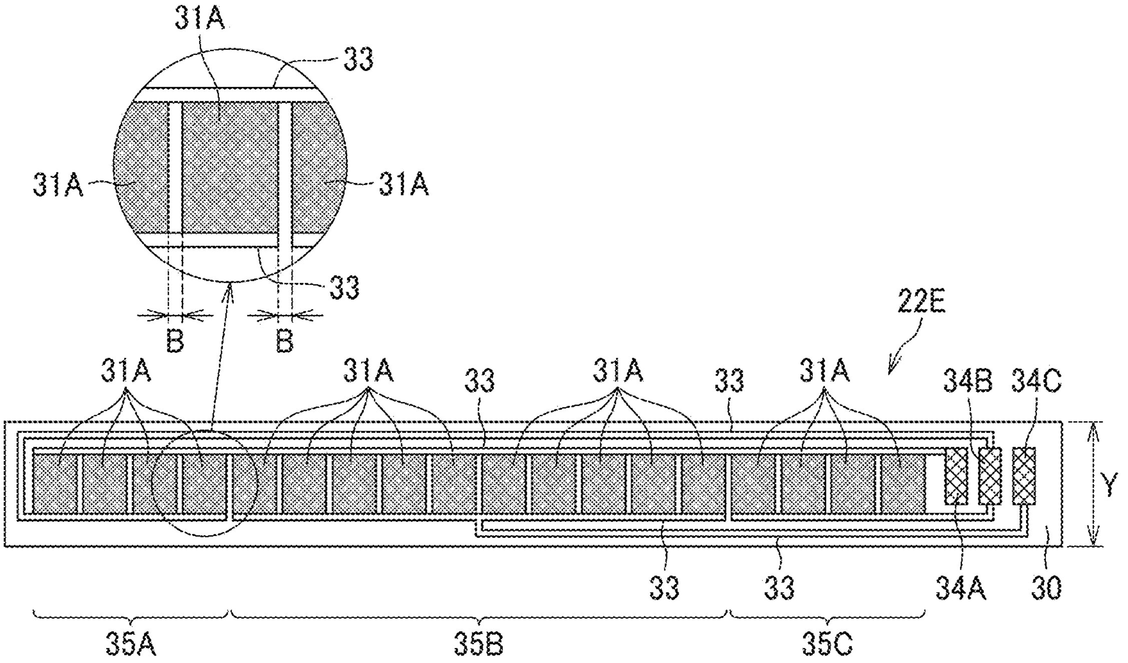
FIG. 30 is a plan view of a heater incorporated in the fixing device depicted in FIG. 29.

As illustrated in FIG. 30, the conductor layer of the heater 22E includes the plurality of resistive heat generators 31A, the feeders 33, the electrodes 34A and 34B, and an electrode 34C. According to the embodiment also, as illustrated in an enlarged view in FIG. 30, the gap B serving as the dividing region is interposed between the adjacent resistive heat generators 31A arranged in a longitudinal direction of the heater 22E. FIG. 30 illustrates the two gaps B in the enlarged view. However, the gap B is disposed at each interval between the adjacent resistive heat generators 31A depicted in FIG. 30. The heater 22E further includes three heat generation portions 35A, 35B, and 35C each of which is constructed of the resistive heat generators 31A. As the electrodes 34A and 34B are energized, the heat generation portions 35A and 35C generate heat. As the electrodes 34A and 34C are energized, the heat generation portion 35B generates heat. For example, in order to fix a toner image on a sheet P having a decreased size not greater than a predetermined size, the heat generation portion 35B generates heat. In order to fix a toner image on a sheet P having an increased size greater than the predetermined size, the heat generation portions 35A, 35B, and 35C generate heat.

Figure 31:
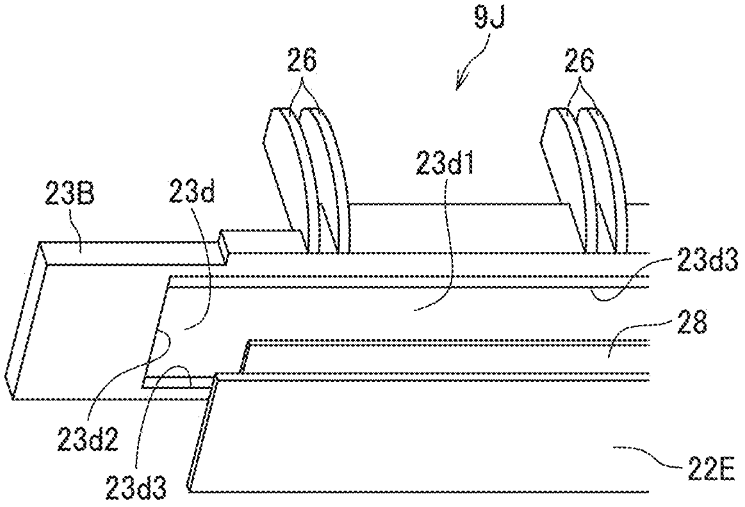
FIG. 31 is a perspective view of the heater depicted in FIG. 30 and a heater holder incorporated in the fixing device depicted in FIG. 29.

As illustrated in FIG. 31, the heater holder 23B includes a recess 23*d* that holds the heater 22E and the first thermal conductor 28. The recess 23*d* is disposed on a heater opposed face of the heater holder 23B, that is disposed opposite the heater 22E. The recess 23*d* includes a bottom face 23*d*1 and walls 23*d*2 and 23d3. The bottom face 23*d*1 is substantially parallel to the base 30 and recessed with respect to the heater 22E compared to other faces of the heater holder 23B. The wall 23*d*2 is disposed at at least one of both lateral ends of the heater holder 23B in a longitudinal direction thereof and serves as an interior wall of the heater holder 23B. The walls 23*d*3 are disposed at both ends of the heater holder 23B in a short direction thereof and serve as interior walls of the heater holder 23B, respectively. The heater holder 23B mounts the guides 26. The heater holder 23B is made of LCP.

Figure 32:
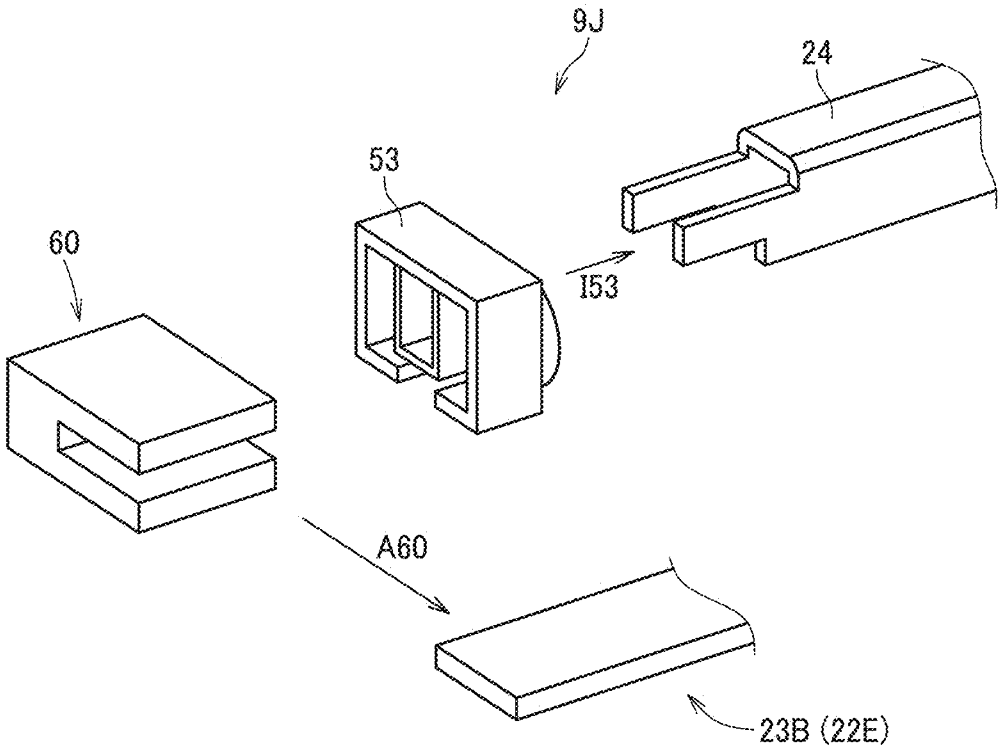
FIG. 32 is a perspective view of the heater depicted in FIG. 31 and a connector to be attached to the heater.

As illustrated in FIG. 32, the fixing device 9J further includes a connector 60 that includes a housing made of resin such as LCP and a plurality of contact terminals disposed in the housing.

The connector 60 is attached to the heater 22E and the heater holder 23B such that the connector 60 sandwiches the heater 22E and the heater holder 23B together at a front face and a back face of the heater 22E and the heater holder 23B. In a state in which the connector 60 sandwiches and holds the heater 22E and the heater holder 23B, as the contact terminals of the connector 60 contact and press against the electrodes 34A, 34B, and 34C of the heater 22E depicted in FIG. 30, the heat generation portions 35A, 35B, and 35C are electrically connected to a power supply disposed in the image forming apparatus 100A through the connector 60. Thus, the power supply is ready to supply power to the heat generation portions 35A, 35B, and 35C. At least a part of each of the electrodes 34A, 34B, and 34C is not coated with the insulating layer and is exposed so that each of the electrodes 34A, 34B, and 34C is coupled with the connector 60.

The fixing device 9J further includes a flange 53 that is disposed on each lateral end of the fixing belt 20 in the longitudinal direction thereof. The flange 53 contacts the inner circumferential face 20*b* of the fixing belt 20 and holds or supports the fixing belt 20 at each lateral end of the fixing belt 20 in the longitudinal direction thereof. The flanges 53 are secured to a frame of the fixing device 9J. The flange 53 is inserted into each lateral end of the stay 24 in the longitudinal direction thereof in an insertion direction 153 illustrated in FIG. 32.

The connector 60 is attached to the heater 22E and the heater holder 23B in an attachment direction A60 illustrated in FIG. 32 that is parallel to the short direction Y of the heater 22E. Alternatively, in order to attach the connector 60 to the heater holder 23B, one of the connector 60 and the heater holder 23B may include a projection that engages a recess disposed in another one of the connector 60 and the heater holder 23B such that the projection moves inside the recess relatively. The connector 60 is attached to one lateral end of the heater 22E and the heater holder 23B in the longitudinal direction of the heater 22E. The one lateral end of the heater 22E and the heater holder 23B is opposite to another lateral end of the heater 22E and the heater holder 23B, with which the driver (e.g., a motor) that drives the pressure roller 21 is coupled.

Figure 33:
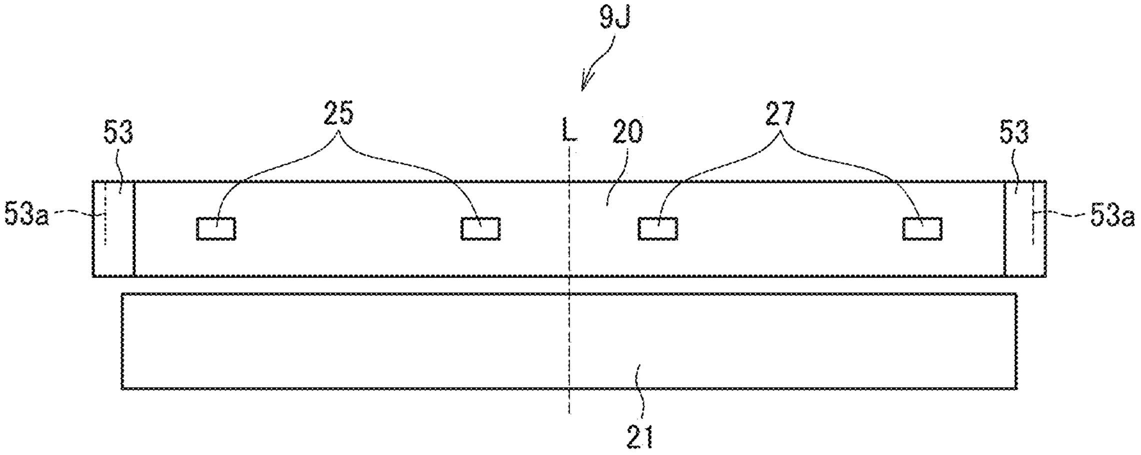
FIG. 33 is a diagram of thermistors, thermostats, and flanges incorporated in the fixing device depicted in FIG. 29, illustrating an arrangement of the thermistors and the thermostats.

As illustrated in FIG. 33, the thermistors 25 are disposed opposite the inner circumferential face 20*b* of the fixing belt 20 at a position in proximity to a center line L and a position in one lateral end span of the fixing belt 20 in the longitudinal direction thereof, respectively. The controller 220 depicted in FIG. 4 controls the heater 22E based on a temperature of the fixing belt 20, that is detected by the thermistor 25 disposed at the position in proximity to the center line L, and a temperature of the fixing belt 20, that is detected by the thermistor 25 disposed opposite the one lateral end span of the fixing belt 20 in the longitudinal direction thereof, respectively.

The thermostats 27 are disposed opposite the inner circumferential face 20*b* of the fixing belt 20 at a position in proximity to the center line L and a position in another lateral end span of the fixing belt 20 in the longitudinal direction thereof, respectively. If the thermostat 27 detects a temperature of the fixing belt 20, that is higher than a preset threshold, the thermostat 27 breaks power to the heater 22E.

The flanges 53 contact and support both lateral ends of the fixing belt 20 in the longitudinal direction thereof, respectively. Each of the flanges 53 is made of LCP.

Figure 34:
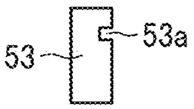
FIG. 34 is a diagram of the flange depicted in FIG. 33, illustrating a slide groove of the flange.

As illustrated in FIG. 34, the flange 53 includes a slide groove 53*a*. The slide groove 53*a* extends in a contact-separation direction in which the fixing belt 20 comes into contact with and separates from the pressure roller 21. The slide groove 53*a* engages an engagement mounted on the frame of the fixing device 9J. As the engagement moves relatively inside the slide groove 53*a*, the fixing belt 20 moves in the contact-separation direction with respect to the pressure roller 21.

Also in the fixing device 9J, like in the embodiments described above, the resistive heat generators 31A are mounted on the back face 30*b* of the base 30, that is opposite to the front face 30*a* of the base 30, that is disposed opposite the slide nip N1. Additionally, the lubricant is applied in a proper amount. Thus, the fixing belt 20 slides over the heater 22E properly.

The above describes the embodiments of the present disclosure. However, the technology of the present disclosure is not limited to the embodiments described above. The embodiments of the present disclosure may be modified variously within the scope of the present disclosure.

Application of the technology of the present disclosure is not limited to the color image forming apparatus 100 depicted in FIG. 1 that forms a color toner image. The technology of the present disclosure is also applied to a monochrome image forming apparatus that forms a monochrome toner image, a copier, a printer, a facsimile machine, a multifunction peripheral (MFP) having at least two of copying, printing, facsimile, scanning, and plotter functions, or the like.

The recording media include, in addition to plain paper as a sheet P, thick paper, a postcard, an envelope, thin paper, coated paper, art paper, tracing paper, an overhead projector (OHP) transparency, plastic film, prepreg, and copper foil.

A description is provided of aspects of the embodiments of the present disclosure.

A description is provided of a first aspect of the embodiments of the present disclosure.

As illustrated in FIG. 9, a heating device (e.g., the fixing devices 9, 9A, 9B, 9C, 9D, 9E, 9F, 9G, 9H, 9I, and 9J) includes a rotator (e.g., the fixing belt 20 and the heating belt 120) serving as a first rotator, a pressure rotator (e.g., the pressure roller 21 and the fixing roller 93) serving as a second rotator, a heater (e.g., the heaters 22, 22A, 22B, 22C, 22D, and 22E), a heater holder (e.g., the heater holders 23, 23A, and 23B), and a lubricant holder (e.g., the grease reservoir 40).

The rotator rotates in a rotation direction (e.g., the rotation direction D20). The pressure rotator presses against the heater via the rotator to form an outer face nip (e.g., the fixing nip N2 depicted in FIGS. 2, 9, 19, 26, and 29 and the heating nip N3 depicted in FIG. 27) between the pressure rotator and the rotator. The heater is disposed opposite an inner face (e.g., the inner circumferential face 20*b*) of the rotator. The heater includes a base (e.g., the base 30) and a resistive heat generator (e.g., the resistive heat generators 31, 31A, 31B, 31C, and 31D). The heater holder includes a recess (e.g., the recess 23*b*) that holds the heater. The base includes a slide face (e.g., the front face 30*a*) over which the inner face of the rotator slides. One of the slide face of the base of the heater and the inner face of the rotator is applied with a lubricant (e.g., the grease 90). The pressure rotator presses against the heater via the rotator to form a slide nip (e.g., the slide nip N1) between the heater and the inner face of the rotator. The pressure rotator rotates and conveys a recording medium (e.g., a sheet P) in a recording medium conveyance direction (e.g., the sheet conveyance direction DP). The lubricant holder is disposed outboard from the slide nip in the recording medium conveyance direction or the rotation direction of the rotator and disposed between the rotator and the heater. The lubricant holder holds the lubricant. The resistive heat generator is mounted on an opposite face (e.g., the back face 30*b*) of the base, that is opposite to the slide face of the base, that defines the slide nip. The lubricant is applied in an application amount A. The inner face of the rotator has a roughness having a height H. The rotator has a length X1 in a longitudinal direction of the rotator. The rotator has a circumference R. The lubricant has a specific density G. The lubricant holder has a volume V. The rotator, the lubricant holder, and the lubricant satisfy a formula of $H \times X1 \times R \times G \leq A \leq V \times G$.

A description is provided of a second aspect of the embodiments of the present disclosure.

In the heating device of the first aspect, the lubricant includes fluorine grease.

A description is provided of a third aspect of the embodiments of the present disclosure.

The heating device of the first aspect or the second aspect further includes a thermal conductor (e.g., the thermal conductors 28, 28A, 28B, and 28C) that contacts the opposite face of the base of the heater.

A description is provided of a fourth aspect of the embodiments of the present disclosure.

In the heating device of any one of the first aspect to the third aspect, the base is made of ceramics having enhanced smoothness.

A description is provided of a fifth aspect of the embodiments of the present disclosure.

In the heating device of any one of the first aspect to the fourth aspect, the slide face of the base of the heater, over which the rotator slides, has a surface roughness not greater than 0.2 μm.

A description is provided of a sixth aspect of the embodiments of the present disclosure.

In the heating device according to any one of the first aspect to the fifth aspect, the inner face of the rotator has a surface roughness not greater than 0.5 μm.

A description is provided of a seventh aspect of the embodiments of the present disclosure.

The heating device of any one of the first aspect to the sixth aspect includes a fixing device that heats and fixes an image on the recording medium.

A description is provided of an eighth aspect of the embodiments of the present disclosure.

An image forming apparatus (e.g., the image forming apparatuses 100 and 100A) includes the fixing device of the seventh aspect.

Accordingly, the rotator slides over the heater properly.

According to the embodiments described above, the fixing belt 20 serves as a fixing rotator. Alternatively, a fixing film, a fixing sleeve, or the like may be used as a fixing rotator. Further, the pressure roller 21 serves as a pressure rotator. Alternatively, a pressure belt or the like may be used as a pressure rotator.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A heating device comprising:
- a first rotator configured to rotate in a rotation direction;
- a heater opposite an inner face of the first rotator, the heater including:
  - a planar resistive heat generator configured to heat the first rotator,
  - at least one electrode,
  - at least one feeder configured to electrically connect the at least one electrode with the planar resistive heat generator,
  - an insulating layer, and
  - a base having a slide face over which the inner face of the first rotator slides and an opposite face being opposite to the slide face, the planar resistive heat generator, the at least one electrode, the at least one feeder, and the insulating layer mounted on the opposite face,
    - one of the slide face of the base of the heater and the inner face of the first rotator being applied with a lubricant;
- a second rotator opposite the heater via the first rotator to form an outer face nip between the first rotator and the second rotator and a slide nip between the heater and the inner face of the first rotator;
- a heater holder configured to hold the heater, the heater holder including a protrusion protruding beyond the slide face of the base of the heater toward the second rotator, the protrusion causing the first rotator to protrude towards the second rotator such that an outer face of the first rotator is in contact with a curved portion of an outer face of the second rotator away from the base; and
- a lubricant holder outboard from the slide nip in the rotation direction of the first rotator and between the first rotator and the heater, the lubricant holder included in a space between the slide face of the base and the inner face of the first rotator, the lubricant holder configured to hold the lubricant,
- the first rotator, the lubricant holder, and the lubricant configured to satisfy a formula of $H \times X1 \times R \times G \leq A \leq V \times G$, and
  - where H is a height of a roughness of the inner face of the first rotator, X1 is a length of the first rotator in a longitudinal direction of the first rotator, R is a circumference of the first rotator, G is a specific density of the lubricant, A is an application amount of the lubricant on the one of the slide face of the base of the heater and the inner face of the first rotator, and V is a volume of the lubricant holder.

2. The heating device according to claim 1, wherein
- the heater holder includes a recess, the heater holder configured to hold the heater in the recess.

3. The heating device according to claim 1, wherein the lubricant includes fluorine grease.

4. The heating device according to claim 3, wherein the lubricant holder includes a grease reservoir configured to hold the fluorine grease.

5. The heating device according to claim 1, further comprising:
- a thermal conductor configured to contact the opposite face of the base of the heater.

6. The heating device according to claim 1, wherein the base of the heater is made of ceramics having enhanced smoothness.

7. The heating device according to claim 1, wherein the slide face of the base of the heater has a surface roughness not greater than 0.2 μm.

8. The heating device according to claim 1, wherein the inner face of the first rotator has a surface roughness not greater than 0.5 μm.

9. The heating device according to claim 1, wherein the first rotator includes a belt.

10. The heating device according to claim 1, wherein the second rotator includes a roller.

11. The heating device of claim 1, wherein the lubricant holder is further configured to store the lubricant at a portion of the lubricant holder which abuts the slide nip.

12. A fixing device comprising:
- a fixing belt configured to rotate;
- a heater opposite an inner face of the fixing belt,
- the heater including:
  - a planar resistive heat generator configured to heat the fixing belt,
  - at least one electrode,
  - at least one feeder configured to electrically connect the at least one electrode with the planar resistive heat generator,
  - an insulating layer, and
  - a base having a slide face over which the inner face of the fixing belt slides and an opposite face being opposite to the slide face, the planar resistive heat generator, the at least one electrode, the at least one feeder, and the insulating layer mounted on the opposite face,
    - one of the slide face of the base of the heater and the inner face of the fixing belt being applied with a lubricant;
- a pressure rotator opposite the heater via the fixing belt to form an outer face nip between the fixing belt and the pressure rotator and a slide nip between the heater and the inner face of the fixing belt, the pressure rotator configured to rotate and convey a recording medium in a recording medium conveyance direction;

a heater holder configured to hold the heater, the heater holder including a protrusion protruding beyond the slide face of the base of the heater toward the pressure rotator, the protrusion causing the fixing belt to protrude towards the pressure rotator such that an outer face of the fixing belt is in contact with a curved portion of an outer face of the pressure rotator away from the base; and a lubricant holder outboard from the slide nip in the recording medium conveyance direction and between the fixing belt and the heater, the lubricant holder included in a space between the slide face of the base and the inner face of the fixing belt, the lubricant holder configured to hold the lubricant, the fixing belt, the lubricant holder, and the lubricant configured to satisfy a formula of $H \times X1 \times R \times G \leq A \leq V \times G$, and where H is a height of a roughness of the inner face of the fixing belt, X1 is a length of the fixing belt in a longitudinal direction of the fixing belt, R is a circumference of the fixing belt, G is a specific density of the lubricant, A is an application amount of the lubricant on the one of the slide face of the base of the heater and the inner face of the fixing belt, and V is a volume of the lubricant holder.

13. An image forming apparatus comprising:

an image bearer configured to bear an image; and a fixing device configured to fix the image on a recording medium, the fixing device including, a fixing belt configured to rotate;

a heater opposite an inner face of the fixing belt, the heater including:

a planar resistive heat generator configured to heat the fixing belt, at least one electrode, at least one feeder configured to electrically connect the at least one electrode with the planar resistive heat generator, an insulating layer, and a base having a slide face over which the inner face of the fixing belt slides and an opposite face being opposite to the slide face, the planar resistive heat generator, the at least one electrode, the at least one feeder, and the insulating layer mounted on the opposite face, one of the slide face of the base of the heater and the inner face of the fixing belt being applied with a lubricant;

a pressure rotator opposite the heater via the fixing belt to form an outer face nip between the fixing belt and the pressure rotator and a slide nip between the heater and the inner face of the fixing belt, the pressure rotator configured to rotate and convey the recording medium in a recording medium conveyance direction;

a heater holder configured to hold the heater, the heater holder including a protrusion protruding beyond the slide face of the base of the heater toward the pressure rotator, the protrusion causing the fixing belt to protrude towards the pressure rotator such that an outer face of the fixing belt is in contact with a curved portion of an outer face of the pressure rotator away from the base; and a lubricant holder outboard from the slide nip in the recording medium conveyance direction and between the fixing belt and the heater, the lubricant holder included in a space between the slide face of the base and the inner face of the fixing belt, the lubricant holder configured to hold the lubricant, the fixing belt, the lubricant holder, and the lubricant configured to satisfy a formula of $H \times X1 \times R \times G \leq A \leq V \times G$, and where H is a height of a roughness of the inner face of the fixing belt, X1 is a length of the fixing belt in a longitudinal direction of the fixing belt, R is a circumference of the fixing belt, G is a specific density of the lubricant, A is an application amount of the lubricant on the one of the slide face of the base of the heater and the inner face of the fixing belt, and V is a volume of the lubricant holder.

14. The image forming apparatus according to claim 13, wherein the heater holder includes a recess, the heater holder configured to hold the heater in the recess.

15. The image forming apparatus according to claim 13, wherein the lubricant includes fluorine grease.

16. The image forming apparatus according to claim 15, wherein the lubricant holder includes a grease reservoir configured to hold the fluorine grease.

17. The image forming apparatus according to claim 13, further comprising:

a thermal conductor configured to contact the opposite face of the base of the heater.

18. The image forming apparatus according to claim 13, wherein the base of the heater is made of ceramics having enhanced smoothness.

19. The image forming apparatus according to claim 13, wherein the slide face of the base of the heater has a surface roughness not greater than 0.2 μm.

20. The image forming apparatus of claim 13, wherein the lubricant holder is further configured to store the lubricant at a portion of the lubricant holder which abuts the slide nip.

* * * * *